US010630566B1

(12) United States Patent
Nguyen

(10) Patent No.: US 10,630,566 B1
(45) Date of Patent: Apr. 21, 2020

(54) TIGHTLY-COUPLED EXTERNAL CLUSTER MONITORING

(75) Inventor: Long X. Nguyen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1547 days.

(21) Appl. No.: 13/528,271

(22) Filed: Jun. 20, 2012

(51) Int. Cl.
*G06F 15/173* (2006.01)
*H04L 12/26* (2006.01)

(52) U.S. Cl.
CPC .................................. *H04L 43/10* (2013.01)

(58) Field of Classification Search
CPC . H04L 43/08; H04L 43/0817; H04L 12/2681; H04L 12/2678; H04L 67/1029; H04L 43/10; H04L 41/046; H04L 41/58041; H04L 63/108; H04L 67/2838; G06F 11/3006; G06F 11/3096; H04F 30/3055
USPC .................................................. 709/223, 224
See application file for complete search history.

(56) References Cited

U.S. PATENT DOCUMENTS

| | | | |
|---|---|---|---|
| 4,665,520 A | 5/1987 | Strom et al. | |
| 5,212,788 A | 5/1993 | Lomet et al. | |
| 5,261,085 A | 11/1993 | Lamport | |
| 5,301,309 A | 4/1994 | Sugano | |
| 5,553,239 A | 9/1996 | Heath et al. | |
| 5,802,267 A | 9/1998 | Shirakihara et al. | |
| 5,845,292 A | 12/1998 | Bohannon et al. | |
| 5,923,832 A | 7/1999 | Shirakihara et al. | |
| 6,078,930 A | 6/2000 | Lee et al. | |
| 6,105,148 A | 8/2000 | Chung et al. | |
| 6,169,991 B1 | 1/2001 | Tsukahara | |
| 6,332,200 B1 | 12/2001 | Meth et al. | |
| 6,363,495 B1 * | 3/2002 | MacKenzie | G06F 11/1482 714/37 |
| 6,374,243 B1 | 4/2002 | Kobayashi et al. | |
| 6,381,617 B1 * | 4/2002 | Frolund et al. | 709/227 |
| 6,516,350 B1 | 2/2003 | Lumelsky et al. | |
| 6,651,242 B1 * | 11/2003 | Hebbagodi | G06F 9/4881 714/2 |
| 6,671,821 B1 * | 12/2003 | Castro | G06F 17/30212 707/E17.007 |

(Continued)

OTHER PUBLICATIONS

George Demarest and Rex Wang. "Oracle Cloud Computing". Oracle Corporation: May 2010. 22 pages.*

(Continued)

*Primary Examiner* — Wing F Chan
*Assistant Examiner* — Andrew Woo
(74) *Attorney, Agent, or Firm* — Robert C. Kowert; Kowert, Hood, Munyon, Ranking & Goetzel, P.C.

(57) ABSTRACT

Methods and apparatus for tightly-coupled external cluster monitoring are disclosed. A system includes a service-providing cluster with a first set of nodes, and a monitoring cluster with a second set of nodes. Nodes of the monitoring cluster comprise respective monitoring agents operable to issue probes to nodes of the service-providing cluster in accordance with a first cluster health monitoring policy, and generate a health check record of the service-providing cluster based on probe results. At least one node of the service-providing cluster comprises a meta-monitoring agent operable to generate a health check record indicative of a health state of the monitoring cluster based at least in part on a second cluster health monitoring policy.

26 Claims, 11 Drawing Sheets

(56) References Cited

U.S. PATENT DOCUMENTS

| | | | |
|---|---|---|---|
| 6,687,847 B1* | 2/2004 | Aguilera et al. ............... 714/4.3 |
| 7,249,280 B2 | 7/2007 | Lamport et al. |
| 7,290,056 B1* | 10/2007 | McLaughlin, Jr. ........................ H04L 43/0852 709/201 |
| 7,426,653 B2 | 8/2008 | Hu et al. |
| 7,577,690 B2 | 8/2009 | Chandrasekaran et al. |
| 7,624,047 B1 | 11/2009 | Round |
| 7,773,522 B2 | 8/2010 | Chafle et al. |
| 7,783,610 B2 | 8/2010 | Lin et al. |
| 7,792,980 B2 | 9/2010 | Eshel et al. |
| 7,925,782 B2 | 4/2011 | Sivasubramanian et al. |
| 7,937,616 B2 | 5/2011 | Armstrong et al. |
| 8,006,124 B2 | 8/2011 | Park et al. |
| 8,037,186 B2 | 10/2011 | Dumitriu et al. |
| 8,046,763 B1 | 10/2011 | Czajkowski et al. |
| 8,073,941 B2 | 12/2011 | Binyamin |
| 8,108,712 B1 | 1/2012 | Carlino et al. |
| 8,108,733 B2 | 1/2012 | Richmond |
| 8,122,098 B1 | 2/2012 | Richardson et al. |
| 8,271,437 B2 | 9/2012 | Arcese et al. |
| 8,321,568 B2 | 11/2012 | Sivasubramanian et al. |
| 2001/0033555 A1 | 10/2001 | Kim et al. |
| 2003/0187927 A1* | 10/2003 | Winchell ............ G06F 11/1492 709/204 |
| 2004/0236912 A1* | 11/2004 | Glasco ................ G06F 12/0817 711/141 |
| 2005/0021306 A1* | 1/2005 | Garcea et al. ................ 702/186 |
| 2005/0028160 A1 | 2/2005 | Cofer et al. |
| 2006/0095438 A1* | 5/2006 | Fachan et al. .................. 707/10 |
| 2006/0136781 A1 | 6/2006 | Lamport |
| 2006/0179059 A1 | 8/2006 | Reed et al. |
| 2007/0156781 A1* | 7/2007 | Kapoor et al. ................ 707/202 |
| 2007/0174541 A1 | 7/2007 | Chandrasekaran et al. |
| 2007/0283002 A1* | 12/2007 | Bornhoevd et al. .......... 709/224 |
| 2008/0177830 A1 | 7/2008 | Vo et al. |
| 2008/0208938 A1 | 8/2008 | Lin et al. |
| 2008/0298256 A1* | 12/2008 | Matsubara .......... G06F 11/0709 370/242 |
| 2009/0177914 A1 | 7/2009 | Winchell |
| 2009/0287720 A1 | 9/2009 | Herter et al. |
| 2009/0327807 A1 | 12/2009 | Varadarajan et al. |
| 2010/0023521 A1 | 1/2010 | Arcese et al. |
| 2010/0161573 A1 | 6/2010 | Chan et al. |
| 2011/0099146 A1* | 4/2011 | McAlister ............ G06F 11/3006 707/634 |
| 2011/0106778 A1 | 5/2011 | Chan et al. |
| 2011/0314326 A1* | 12/2011 | Mahajan ............. G06F 11/2023 714/4.11 |
| 2012/0179791 A1* | 7/2012 | Little ........................ G06F 9/52 709/221 |

OTHER PUBLICATIONS

James Hamilton. "Inter-Datacenter Replication and Geo-Redundancy". Dated May 10, 2010. Archived May 15, 2011. 6 pages. Available online: https://web.archive.org/web/20110515121352/http://perspectives.mvdirona.com/2010/05/10/InterDatacenter-ReplicationGeoRedundancy.aspx.*

Paul Tero. "What to do when your website goes down". Dated Dec. 13, 2010. Archived Jun. 8, 2011. 36 pages. Available online: https://web.archive.org/web/20110608235513/http://coding.smashingmagazine.com/2010/12/13/what-to-do-when-your-website-goes-down/.*

Nicole Sergent, Xavier Défago, André Schiper. "Impact of a Failure Detection Mechanism on the Performance of Consensus". Proceedings of 2001 Pacific Rim International Symposium on Dependable Computing, Dec. 17-19, 2001. pp. 135-145.*

"Configuration Guide for BIG-IP® Local Traffic Management, Version 10.0.0 (MAN-0292-00)". Published by F5 Networks, Inc., May 29, 2009. 575 pages.*

Rick Kazman, Len Bass, Paul Clements. "Software Architecture in Practice", 2nd ed. Addison-Wesley Professional: Apr. 9, 2003. Chapter 5, Section 2: Availability Tactics. 4 pages.*

Baron Schwartz. "mk-heartbeat—Monitor MySQL replication delay". Proven Scaling LLC, SixApart Ltd, Percona. Archived Jun. 15, 2011. 11 pages. Available online: https://web.archive.org/web/20110615003329/http://www.maatkit.org/doc/mk-heartbeat.html.*

Sage A. Weil. CEPH: Reliable, Scalable, and High-Performance Distributed Storage. University of California: Santa Cruz. Dec. 2007. 239 pages.*

Christof Fetzer, Michel Raynal, and Frékderic Tronel. "An adaptive failure detection protocol". In "Proceedings of 2001 Pacific Rim International Symposium on Dependable Computing". pp. 146-153. IEEE: Dec. 2001.*

Paulo Veríssimo and Luís Rodrigues. "Distributed Systems for System Architects." Springer Science+Business Media: New York. 625 numbered pages, plus front matter. 2001 (month unknown).*

Benjamin Satzger, Andreas Pietzowski, Wolfgang Trumler, and Theo Ungerer. "A Lazy Monitoring Approach for Heartbeat-Style Failure Detectors." In Third International Conference on Availability, Reliability and Security, 2008. ARES 08. pp. 404-409. IEEE. Mar. 4-7, 2008.*

Flavio P. Junqueira, Benjamin C. Reed, and Marco Serafini. "Zab: High-performance broadcast for primary-backup systems". In: 2011 IEEE/IFIP 41st International Conference on Dependable Systems & Networks (DSN), Jun. 27-30, 2011. IEEE. pp. 245-256.*

Patrick Hunt, Mahadev Konar, Flavio P. Junqueira, and Benjamin Reed. "ZooKeeper: Wait-free coordination for Internet-scale systems". In USENIX ATC'10 Proceedings of the 2010 USENIX conference on USENIX annual technical conference. USENIX, Jun. 23-25, 2010. pp. 1-11.*

Various authors. "LearnerHandler.java"—Java source code, line numbers added. ZooKeeper v3.3.3 tarball, metadata date Feb. 23, 2011. 11 printed pages. Available online: https://archive.apache.org/dist/zookeeper/zookeeper-3.3.3/zookeeper-3.3.3.tar.gz.*

Various authors. "Leader.java"—Java source code, line numbers added. ZooKeeper v3.3.3 tarball, metadata date Feb. 23, 2011. 15 printed pages. Available online: https://archive.apache.org/dist/zookeeper/zookeeper-3.3.3/zookeeper-3.3.3.tar.gz.*

Various authors. "ClientCnxn.java"—Java source code, line numbers added. ZooKeeper v3.3.3 tarball, metadata date Feb. 23, 2011. 28 printed pages. Available online: https://archive.apache.org/dist/zookeeper/zookeeper-3.3.3/zookeeper-3.3.3.tar.gz.*

Various authors. "Learner.java"—Java source code, line numbers added. ZooKeeper v3.3.3 tarball, metadata date Feb. 23, 2011. 9 printed pages. Available online: https://archive.apache.org/dist/zookeeper/zookeeper-3.3.3/zookeeper-3.3.3.tar.gz.*

Tom White. "Hadoop: The Definitive Guide, 2nd Edition". O'Reilly Media, Inc. Oct. 5, 2010. Chapter 14. 24 printed pages.*

Microsoft Computer Dictionary, 5th ed. Microsoft Press. Mar. 15, 2002. p. 131.*

Fabio Panzieri and Santosh K. Shrivastava. "Rajdoot: A Remote Procedure Call Mechanism Supporting Orphan Detection and Killing". IEEE Transactions on Software Engineering. vol. 14. No. 1. Jan. 1988. pp. 30-37.*

"Future (Java 2 Platform SE 5.0)," 2004/2010 Oracle and/or its Affiliates, downloaded from docs.oracle.com/javase/1.5.0/docs/api/jaya/util/concurrent/Future.html, pp. 1-4.

U.S. Appl. No. 13/528,301, filed Jun. 20, 2012, Long X. Nguyen, et al.

U.S. Appl. No. 13/528,249, filed Jun. 20, 2012, Long X. Nguyen, et al.

U.S. Appl. No. 13/528,340, filed Jun. 20, 2012, Long X. Nguyen.

U.S. Appl. No. 12/771,840, filed Apr. 30, 2010, Allan H. Vermeulen, et al.

U.S. Appl. No. 12/887,042, filed Sep. 21, 2010, Allan H. Vermeulen, et al.

U.S. Appl. No. 12/771,851, filed Apr. 30, 2010, Allan H. Vermeulen, et al.

"The Chubby lock service for loosely-coupled distributed systems," Mike Burrows, Google, Inc., pp. 335-350 Year of Publication: 2006, ISBN:1-931971-47-1.

(56) References Cited

OTHER PUBLICATIONS

"Transparent Checkpoint-Restart of Distributed Applications on Commodity Clusters," Laaden, et al., Appears in Proceedings of the 2005 IEEE International Conference on Cluster Computing (Cluster 2005), Boston, MA, Sep. 26-30, 2005.
"Paxos Made Live—An Engineering Perspective," Chandra, et al., Jun. 20, 2007, pp. 1-16.
"Paxos Made Simple," Leslie Lamport, Nov. 1, 2001., pp. 1-14.
"Restoring Consistent Global States of Distributed Computations," Goldberg, et al., 1991 ACM, pp. 144-154.
"Distributed Checkpointing: Analysis and Benchmarks," Gustavo M. D. Vieira and Luiz E. Buzato, Gustavo M. D. Vieira and Luiz E. Buzato. In Proceedings of the 24th Brazilian Symposium on Computer Networks, SBRC, vol. 6, 2006. Partially supported by CAPES under grant No. 01P-15081/1997, pp. 1-16.
U.S. Appl. No. 15/716,201, filed Sep. 26, 2017, Davis, et al.

\* cited by examiner

TIGHTLY-COUPLED EXTERNAL CLUSTER MONITORING

BACKGROUND

Implementing computing systems that manage large quantities of data and/or service large numbers of users often presents problems of scale. For example, as demand for various types of computing services grows, it may become difficult to service that demand without increasing the available computing resources accordingly. To facilitate scaling in order to meet demand, a particular computing service might be implemented as a distributed application that executes on a number of instances of computing hardware. For example, a number of different software processes executing on different computer systems may operate cooperatively to implement the computing service. When more service capacity is needed, additional hardware or software resources may be deployed.

However, implementing distributed applications may present its own set of challenges. For example, in a geographically distributed system, it is possible that different segments of the system might become communicatively isolated from one another, e.g., due to a failure of network communications between sites. As a consequence, the isolated segments may not be able to coordinate with one another. If care is not taken in such circumstances, inconsistent system behavior might result (e.g., if the isolated segments both attempt to modify data to which they would ordinarily coordinate access).

More generally, the larger the distributed system, the more difficult it may be to coordinate the actions of various actors within the system (e.g., owing to the difficulty of ensuring that many different actors that are potentially widely distributed have a consistent view of system state). In some environments, a group of resources may be organized as a cluster to provide infrastructure services, such as general-purpose state coordination functionality, to other distributed applications. For example, such a cluster may comprise a plurality of logical or physical compute resources, linked by an appropriate interconnect, working together to provide read and write access to a shared repository containing state information for various other applications and services of the distributed environment. In order to ensure continued provision of the state coordination service by such a cluster, the health of the cluster may need to be monitored using a reliable monitoring mechanism.

Figure 1:
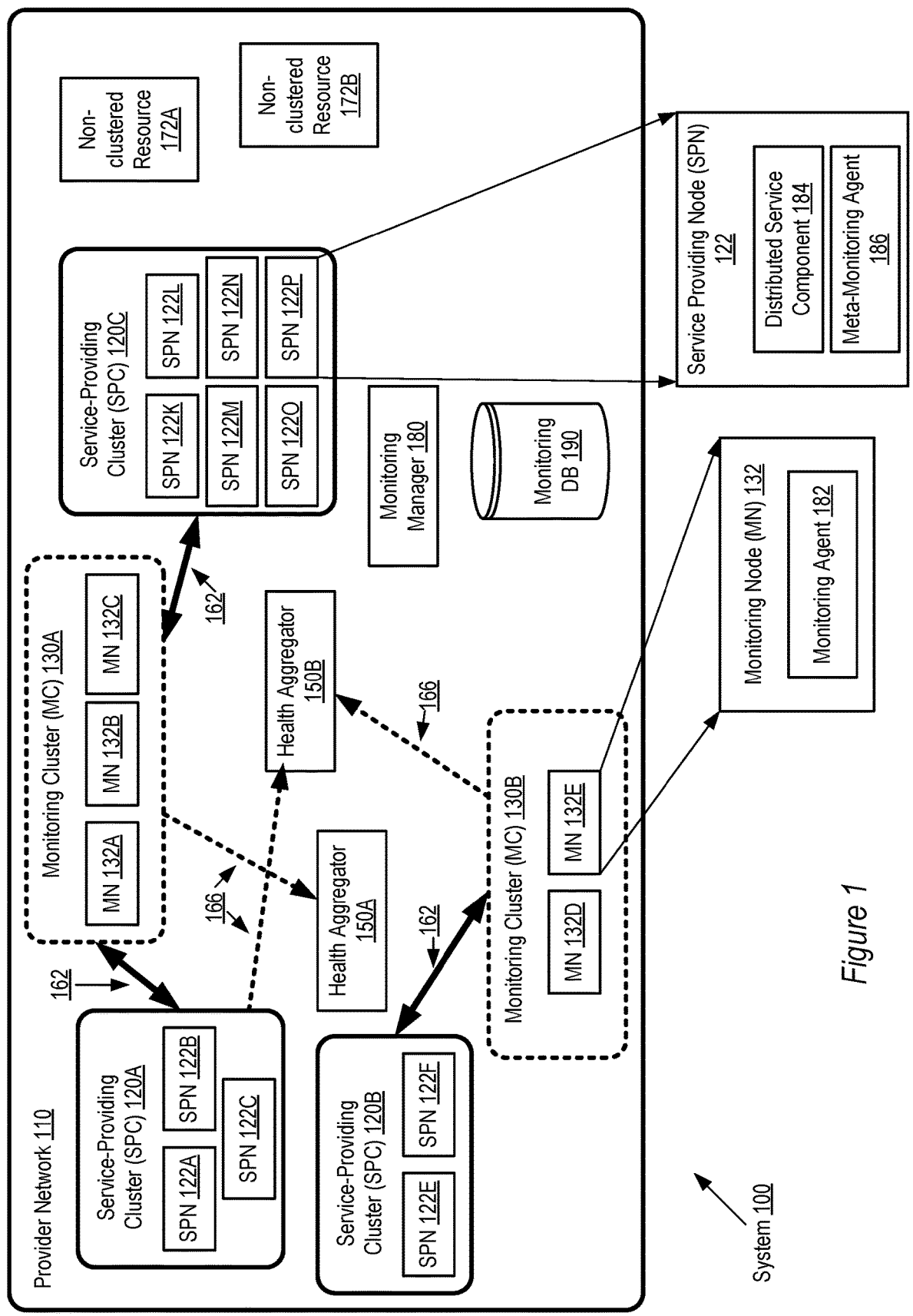
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for supporting tightly coupled external cluster monitoring in distributed networking environments are described. Networks set up by an entity such as a company or a public sector organization to provide one or more services accessible via the Internet and/or other networks to a distributed set of clients may be termed provider networks in this document. The services may include a core set of infrastructure-related services such as provision of computing platforms or storage platforms, as well as more advanced services that are built using the core services, such as for example database services, load balancing services, application deployment services, search services and the like. Such a provider network may include numerous data centers, each comprising potentially large numbers of computing platforms or devices, such as collections of physical and/or virtualized computer servers, storage devices, networking equipment and the like, needed to implement and distribute services offered by the provider. In some provider networks, resources configured on the platforms may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

In at least some embodiments, various groups of resources of the provider network may be configured as clusters, where each cluster comprises a plurality of resources cooperating to implement at least a portion of one of the services of the provider network in accordance with one or more service protocols. Some clusters may be set up to support infrastructure services (e.g., a clustered locking service may be implemented for use by several other services of the provider network, or a clustered internal monitoring service may be set up to monitor the health of various portions of the provider network), and may not be directly accessible by end users of the provider network; other clusters may implement client applications, may be configured in response to end-user requests, and may be accessed by end-user clients. The resources making up a given cluster may comprise any combination of logical and physical devices; in some cases, several or all nodes of a given cluster may comprise software components executing on the same hardware platform.

Depending on the implementation, some of the clusters in the provider network may utilize an internal failure detection mechanism, so that for example when one of the cluster nodes fails, or connectivity is lost between some nodes, the appropriate corrective actions are taken. In addition to the internal failure detection mechanism, at least for some important service-providing clusters, external monitoring mechanisms may also be implemented in some embodiments, in which, for example, other resources of the provider network (i.e., resources not included among the nodes of the service-providing cluster) periodically check the status of the service-providing cluster. In at least some embodiments, such external monitoring may itself be provided using a cluster of monitoring resources. For example, a cluster C1 that comprises N1 nodes providing a particular service Si (such as a locking service) may be monitored by another cluster C2 that includes N2 nodes. In this example, the cluster C1 may be termed the "service-providing cluster (SPC)" and the cluster C2 may be termed the "monitoring cluster (MC)". In different embodiments, C2 may use any desired cluster health monitoring policy (CHMP) to monitor C1's health state. A particular CHMP may define the specific health states (e.g., what it means for C1 to be considered healthy, and under what conditions a node of C1 is to be considered in an acceptable or healthy state) for the service-providing cluster. In addition, a CHMP in some embodiments may indicate the specific techniques to be used to determine whether C1 is healthy (e.g., the content and/or format of health probes to be issued, or application programming interfaces (APIs) to be called), techniques to be used to determine whether individual nodes of C1 are healthy, actions to be taken in response to determining that one or more nodes of C1 are not in an acceptable state, actions (if any) to be taken in response to determining that one or more nodes of C1 are in an acceptable state, and so on. In at least some embodiments a CHMP may be parameterized, e.g., modifiable configuration parameters may govern various aspects of the CHMP, such as how many probes are to be attempted before making a determination regarding the health state of the monitored cluster.

While the monitoring cluster (C2 in the above example) may be able to provide assurances regarding the state of the service-providing cluster (C1), under some conditions the nodes of C2 may themselves fail or become unreachable. Accordingly, at least in some embodiments, one or more nodes of the service-providing cluster may be configured to monitor the health of the monitoring cluster, e.g., potentially using a different CHMP that defines the acceptable states of C2 and C2's nodes, the techniques to be used to determine the health of C2 nodes, and so on. In this way, a reciprocal monitoring relationship may be set up between SPCs and MCs, so that the reliability and availability of both types of clusters may be increased. In at least some embodiments, the primary responsibility of MC nodes may be monitoring SPCs, so a single MC may gather health information for a plurality of SPCs. In contrast, in some embodiments, monitoring the MC (which may be referred to herein as "reciprocal monitoring" or "meta-monitoring") may only be a minor part of the functionality of SPC nodes, and as a result, the nodes of an SPC may only have to monitor one or a small number of monitoring clusters. Furthermore, given the core service-providing responsibilities of SPC nodes, a lightweight, low-overhead CHMP may be chosen for meta-monitoring in some embodiments, so as not to overload SPC nodes. In other embodiments, in addition to performing health monitoring, a given MC may also be responsible for providing at least a portion of the functionality of other network-accessible services. The nodes of service-providing clusters may be referred to herein as service-providing nodes (SPNs), and the nodes of monitoring clusters may be referred to as monitoring nodes (MNs). In at least some embodiments, one or more nodes of an SPC may be implemented as distinct processes executing on the same hardware platform. In one embodiment, one or more nodes of an MC may share the same hardware platform or computing device as one or more nodes of an SPC—i.e., the same computing device may host an SPN node or process as well as an MN node or process.

According to some embodiments, a system may include an SPC comprising a first plurality of nodes implementing at least a portion of a distributed network-accessible service, and an MC comprising a second plurality of nodes. Each of one or more nodes of the MC may include a respective monitoring agent operable to issue probes to at least one node of the service-providing cluster in accordance with a first CHMP, and generate a health check record indicative of a health state of the service-providing cluster based at least in part on results of the probes. Each node of the SPC may include a respective service component of the distributed network-accessible service, and at least one node of the SPC may include a meta-monitoring agent operable to generate a health check record indicative of a health state of the MC, based at least in part on a second CHMP. In some implementations, if a particular health check record indicates that a given node (either an SPC node or an MC node) is in an unhealthy state, several health check records may first be collected in an effort to confirm the existence of the unhealthy state, before any corrective action is taken. In some embodiments, the system may include other resources designated as health aggregators responsible for collecting health check records from various SPC and MC nodes and initiating reporting, generating alarms, and the like, if an unhealthy state is confirmed from multiple health check records.

Several different types of services may be implemented by SPCs in various embodiments, and in some embodiments the MC may use aspects of the service being provided by the SPN (whose primary purpose may be completely unrelated to health monitoring) to generate the health check records.

For example, in one embodiment the distributed network-accessible service of an SPC may comprise an implementation of a protocol (such as a consensus-based protocol, or some other protocol) to determine whether a transaction comprising a requested write operation to a shared data repository is to be committed. Thus, in such an embodiment an SPC may provide a distributed state management or distributed lock management service. At least one probe issued by a particular monitoring agent on a particular node of the MC in such an embodiment may include a transaction request with at least one write operation. In accordance with the CHMP being used by the MC, the particular monitoring agent may generate a health check record indicating that the SPC is in a healthy state based at least in part on receiving a commit indication corresponding to the transaction request. Thus, the primary purpose of the SPC in this scenario may be to coordinate access to a shared data repository, e.g., for managing state of other distributed applications, using transactions whose commit decisions are determined using a consensus based protocol. The MC may utilize the core transaction-processing functionality of the SPC as a way to determine the health of the SPC, without for example having to implement more complex monitoring strategies than simple write transactions. Further details regarding an SPC that provides distributed state management functionality using a consensus-based protocol are provided below.

In some embodiments in which the transaction-handling functionality of an SPC may used to monitor the SPC's health, the health of the MC itself may also be monitored by nodes of the SPC using aspects of the core functionality of the SPC. For example, in accordance with the second CHMP in such an embodiment, the meta-monitoring agent at a particular node of the SPC may generate a health check record indicating that the MC is in a healthy state based at least in part on determining that a probe (e.g., a write transaction) was received at the SPC from a monitoring agent of at least one of the nodes of the MC within a time interval indicated in the second CHMP. If a write transaction request was received within the last X seconds, for example, the MC may be considered to be healthy; if no write transaction was received in the last X seconds from any node of the MC, the health of the MC may be considered suspect.

In at least some embodiments, an MC node may issue several probes, potentially to more than one node of the SPC, before it generates a health check record that indicates that the SPC is in an unhealthy state. For example, if a probe to one node N1 fails to indicate that the SPC is healthy, the MC node may first issue additional probes to that same node; if none of those probes indicate that the SPC is healthy, the MC node may choose one or more additional nodes to probe, and so on. In such an embodiment, the MC node may wait to generate its health check record until either (a) any one of the probes results indicate that the SPC is in fact healthy or (b) all of the probes fail to indicate that the SPC is healthy.

According to at least some embodiments, a health aggregator may be configured to collect a plurality of health check records of the SPC from a plurality of nodes of an MC, e.g., over a time period specified in the first CHMP, to provide an addition level of assurance that corrective actions are taken only if there is a high probability that a failure has actually occurred. The health aggregator may initiate one or more corrective actions in response to a determination, based at least in part on an analysis of health check results collected from multiple MC nodes, that the SPC is in an unhealthy state. The corrective actions may include, for example, raising alerts, generating support tickets, rebooting/restarting cluster nodes, and the like. In at least some embodiments, a health aggregator may itself be configured as a fault-tolerant system (e.g., using one or more hardware and/or software fault tolerance techniques, such as separate primary and failover servers, or separate primary and failover processes).

In some embodiments, the nodes of a particular MC or SPC may be distributed among various locations, e.g., one node may be in a different data center than another. A programmatic interface, such as an API, may be implemented to allow a requester to submit a cluster health status query. In one embodiment, special monitoring APIs may be supported by the SPC and/or MC nodes to be used to monitor node and cluster health, e.g., an "ARE_Y-OU_HEALTHY" query API call may be issued from a monitoring or meta-monitoring agent, and the targeted node may be considered to be in a healthy state only if a corresponding "I_AM_HEALTHY" response is received within a time period identified in the CHMP being used. In some embodiments, various parameters of the CHMP, such as the number of distinct probes to be attempted during a given health monitoring iteration, or the number of nodes of an SPC to be probed, may be tunable. In such an embodiment, the parameters may be automatically tuned, e.g., based on metrics indicating the overhead associated with health monitoring, and/or in accordance with service level agreements (SLAs) established for how quickly node and cluster failures are to be identified in the provider network. For example, if the SLA indicates that corrective action for any node failure at an SPC should be initiated within X seconds, and measurements indicate that it is on average taking longer than X seconds, some of the parameters may be tuned (e.g., by a monitoring manager component of the provider network) to try to make the cluster health determinations more quickly. In some embodiments, one or more probes issued by a node of a MC may be formatted in accordance with the programmatic interface.

Example System Environment

FIG. 1 illustrates an example system environment, according to at least some embodiments. The system 100 comprises a provider network 110 with a plurality of resources (e.g., virtual or physical compute or storage resources, networking devices and the like). Some of the resources are grouped into clusters, such as service-providing clusters (SPCs) 120A, 120B, and 120C, as well as monitoring clusters (MCs) 130A and 130B. Each cluster may comprise a plurality of resources designated as nodes of the cluster—e.g., SPC 120A includes service providing nodes (SPNs) 122A, 122B and 122C, SPC 120B includes SPNs 122E and 122F, SPC 120C includes SPNs 122K, 122L, 122M, 122N, 122O, and 122P. In the depicted embodiment, MC 130A includes monitoring nodes (MNs) 132A, 132B and 132C, and MC 130B includes MNs 132D and 132E. As indicated by the double arrows labeled 162, each of the depicted SPCs may be monitored by at least one MC, and in a reciprocal relationship, each of the MCs may be monitored by at least one SPC. For example, MC 130A may be monitoring SPC 120A and 120C, while MC 130B may be monitoring SPC 120B; SPC 120A (and/or SPC 120C) may in turn be monitoring MC 120A, and SPC 120B may be monitoring MC 120B.

The provider network may also include various un-clustered resources (i.e., resources that are not currently part of any SPC or MC, but may be enlisted in such clusters as needed), such as resources 172A and 172B, as well as one or more health aggregators such as 150A and 150B, and a monitoring manager 180. As indicated by the arrows labeled 166, the health aggregators 150 may be configured to collect health check records from various MC nodes indicative of SPC health, and/or health check records from SPC nodes indicative of MC health, and take corrective actions if necessary. For example, health aggregator 150A may collect health check records from the MNs 132A, 132B and 132C regarding the health state of SPCs 120A and 120C. Health aggregator 150B may collect health check records from SPC 120A regarding the health of MC 120A, and health check records from MC 120B regarding the health state of SPC 120B. Monitoring manager 180 may be responsible in some embodiments for assigning and configuring health monitoring responsibilities—e.g., setting up MCs, providing health management policy details to MC nodes and SPC nodes, gathering metrics on the performance and effectiveness of the health monitoring policies in use, modifying tunable parameters of the health monitoring policies, and so on. Metadata regarding the cluster health monitoring policies in use, and the monitoring-related roles and responsibilities of the various SPCs and MCs, may be stored in a persistent repository such as monitoring database 190 in some embodiments.

In the illustrated embodiment, at least some of the MC nodes, such as MN 132E, may comprise a monitoring agent 182 (such as a software process or thread of execution, or a hardware device), configured to issue probes to at least one node of an SPC (e.g., SPC 120B) in accordance with a first cluster health monitoring policy (CHMP), and to generate health check records indicative of the health state of the SPC using results of the probes. In some implementations the result of a single probe may be sufficient to generate the health check record, while in other cases, as described below, the monitoring agent 182 may iterate over several probes or several SPC nodes, before generating a single health check record. In some embodiments, the monitoring agent 182 may be configured to determine whether an SPC is healthy or not, without the help of other MNs 132 or health aggregators 150; in other embodiments, collaboration between several MNs and/or health aggregators may be required before a decision regarding health state of an SPC is made, or a corrective action such as a support call or alert is initiated.

SPC nodes, such as SPN 122P, may comprise a component of a distributed, network accessible service (such as a distributed state management service) being implemented by the SPC in the depicted embodiment. At least some SPNs of some SPCs may include a meta-monitoring agent 186, responsible for generating health check records for MC nodes or MCs in accordance with a CHMP. In some embodiments, different CHMPs may be used for monitoring the health of different SPCs and MCs; in other embodiments, the same CHMP may be used to monitor the health of more than one SPC, or more than one MC, or a collection of SPCs and MCs. Not all the SPNs 122 of a given SPC 120 may be configured with meta-monitoring agents 186 in some embodiments. Similarly, in some embodiments a particular MN 132 may comprise not just a monitoring agent 182, but also other components such as service components of one of the provider network's services. Various additional details regarding the functionality of MNs 132, SPNs 122, health aggregators 150, and monitoring manager 180 in different embodiments are provided below.

Distribution of SPC and MC Nodes Across Data Centers

Figure 2:
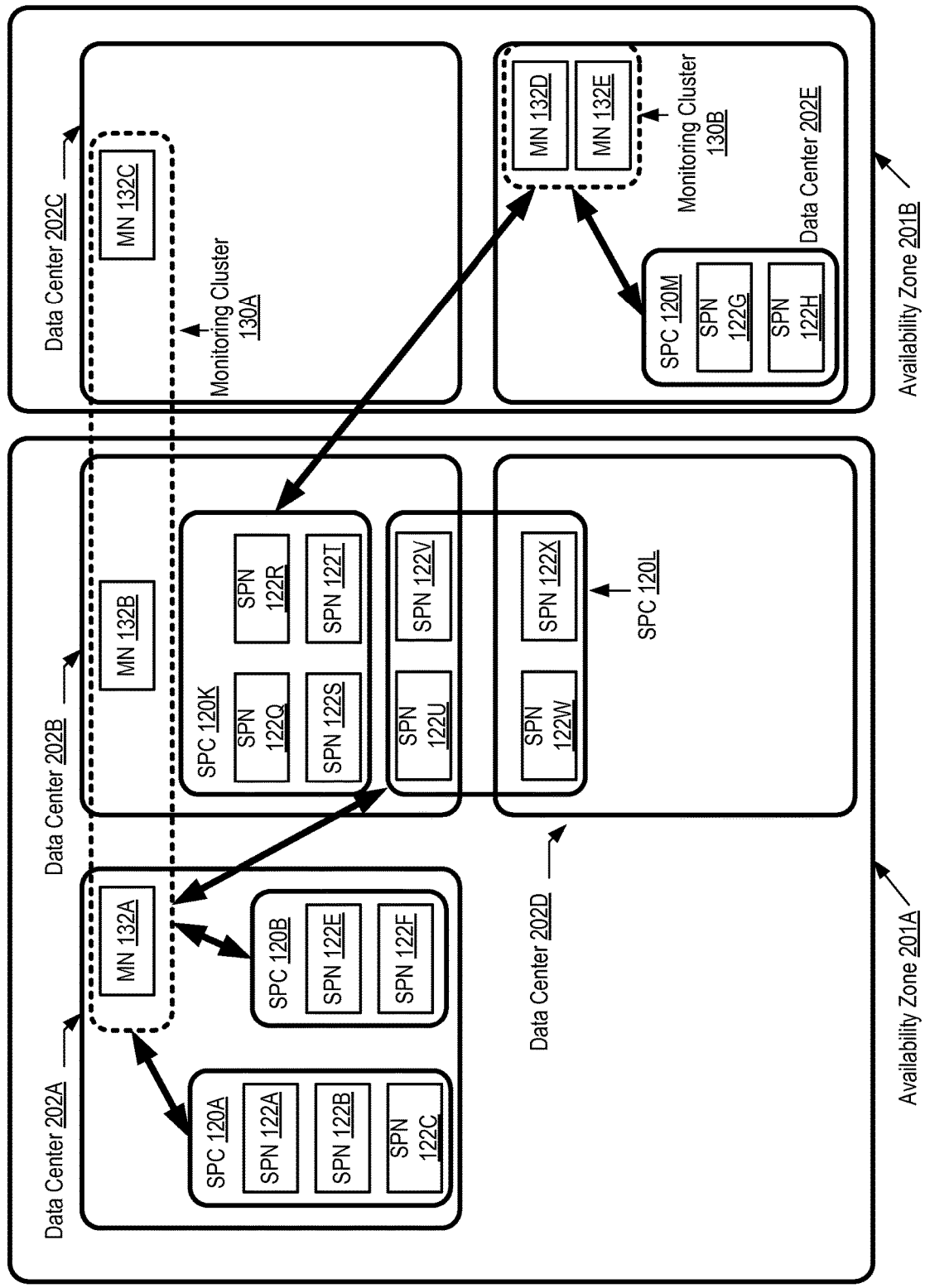
FIG. 2 illustrates an example provider network configuration comprising two availability zones, according to at least some embodiments.

In at least some embodiments, the provider network 110 may be organized into a plurality of geographical regions, and each region may include one or more availability zones. FIG. 2 illustrates an example provider network configuration comprising two availability zones, 201A and 201B, according to at least some embodiments. An availability zone 201 in turn may comprise one or more distinct locations or data centers in some embodiments such as the embodiment shown in FIG. 2, while in other embodiments, a single data center may include portions of several availability zones. Availability zones may be engineered in such a way that the resources in a given availability zone are insulated from failures in other availability zones. That is, a failure in one availability zone may not be expected to result in a failure in any other availability zone; thus, the availability profile of a resource is intended to be independent of the availability profile of a resource in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

As illustrated in FIG. 2, a number of different placement choices may be possible for the nodes of various SPCs and MCs, i.e., regarding how the nodes of such clusters are distributed among the data centers and availability zones of the provider network. As shown, availability zone 201A may comprise data centers 202A, 202B and 202D, and availability zone 201B may comprise data centers 202C and 202E. In some cases, all the nodes of an SPC may be implemented within a single data center—for example, all SPNs of SPC 120A and 120B are located in data center 202A, all SPNs of SPC 120B are located in data center 202A, all SPNs of SPC 120K are in data center 202B, and all SPNs of SPC 120M are in data center 202E. In other cases, depending for example on how tightly-coupled the nodes of an SPC have to be to provide the service being provided, the nodes of a given SPC may span multiple data centers (or even multiple availability zones). In the illustrated example, SPNs 122U and 122V of SPC 120L are located in data center 202B, while SPNs 122W and 122X of the same SPC 120L are located in data center 202D.

In the depicted embodiment, the nodes of a monitoring cluster may also be distributed across multiple data centers, or even across multiple availability zones. For example, MN 132A of MC 130A is located in data center 202A, MN 132B is located in data center 202B, and MN 132C is located in a third data center 202C, which is in a different availability zone 201B than MNs 132A and 132B. MNs 132D and 132E of MC 130B are both located in data center 202E.

A given monitoring cluster 130 may be responsible for generating health check records of service-providing clusters located at least in part in other data centers, or other availability zones, in the depicted embodiment. For example, MC 130B is responsible for monitoring SPC 120K in a remote data center, as well as for monitoring SPC 120M resident in the same data center as MC 130B. MC 130A, itself distributed across three data centers 202A, 202B and 202C, may be responsible for monitoring SPCs 120A, 120B, and 120K whose nodes collectively reside in data centers 202A, 202B and 202D. Similarly, the meta-monitoring agents at SPNs of a given SPC may monitor MCs whose nodes reside in other data centers or other availability zones in some embodiments. In some implementations, it may also be possible to configure more than one MC to monitor a given SPC, and/or to configure more than one SPC to monitor a given MC. Any desired placement mapping between the nodes of various SPCs and MCs, and data canters, availability zones and regions, may be implemented in some embodiments. Over time, the membership of a given SPC or a given MC may change in some embodiments—e.g., an SPN that fails may be replaced by another, and an MC that fails may be replaced by another, potentially in another data center, as needed. In some embodiments, it may be advisable to distribute the MNs of a given MC across multiple data centers or availability zones so as to decrease the likelihood that a failure in one data center affects SPC health monitoring. There may be greater constraints on SPC node placement than on MC node placement—e.g., the nature of the service being provided may require fast network links between the SPNs of an SPC, so it may not always be advisable or feasible to distribute the SPNs across multiple data centers or multiple availability zones. In at least some embodiments, an SPC owned/managed by one business organization or legal entity may be monitored by (and may also monitor) an MC belonging to another business organization or legal entity. Thus it may be possible for one business organization to offer the reciprocal monitoring capability described herein to other organizations as a service in some embodiments.

Distributed State Manager Cluster with Monitoring Nodes as Clients

In at least some embodiments, at least one of the SPCs 120 of a provider network may be configured to implement a distributed state management (DSM) service, in which updates to a registry comprising state information of one or more distributed client applications is coordinated by a plurality of SPNs 122 of the SPC. The DSM SPC may provide transaction management services in such embodiments, according to which, for example, writes to registry elements are committed using a consensus-based protocol in which several SPNs participate. If a write transaction succeeds, the client process that requested the write is provided a time-stamped notification of success. A monitoring cluster may act as a distributed client application utilizing the state manager SPC's transaction functionality in such embodiments to monitor the state of the SPC. For example, each monitoring node may function as a client application process, and use write transactions as probes, with the write notifications being used as evidence as to whether the SPC is in a healthy state or not. Furthermore, one or more nodes of the DSM may monitor the health of the client processes (the monitoring nodes), by, for example, tracking how recently a write transaction from one of the client processes was received.

Figure 3:
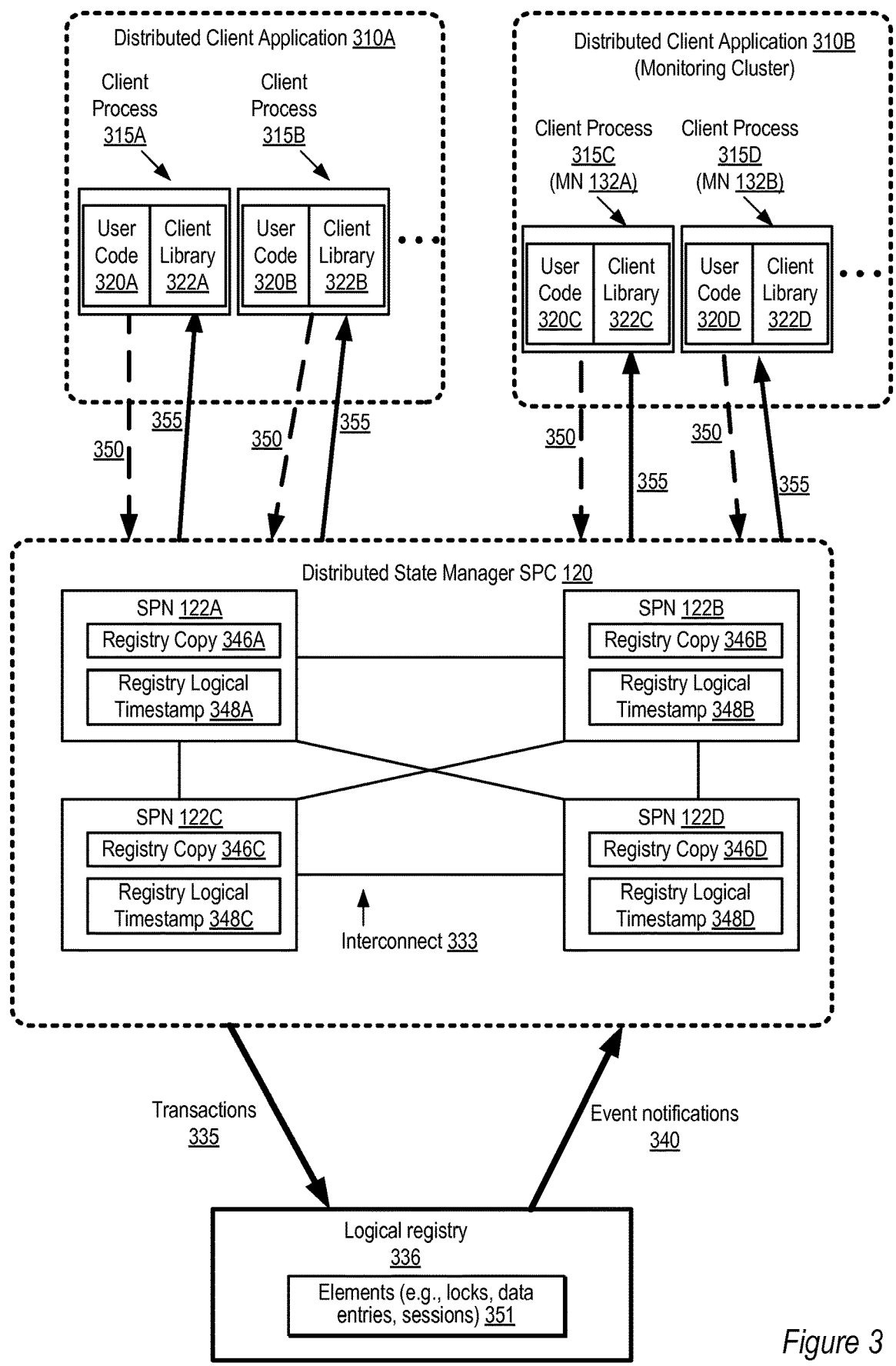
FIG. 3 illustrates various components of an example distributed state management service providing cluster, according to at least some embodiments.

FIG. 3 illustrates various components of such an example DSM, according to at least some embodiments. In the illustrated embodiment, the DSM comprises a service-providing cluster 120 with a plurality of SPNs 122 (e.g., 122A, 122B, 122C and 122D), as well as DSM client library components 322 (e.g., 322A, 322B, 322C and 322D). A given DSM SPC 120 may coordinate changes to state information for a plurality of distributed client applications 310, such as 310A and 310B, each of which may include a plurality of client threads of execution or client processes 315, such as client processes 315A and 315B of application 310A and client processes 315C and 315D of application 310B. In the embodiment shown, client processes 315C and 315D implement monitoring nodes 132A and 132B, i.e., client application 310B represents a monitoring cluster 130. In general, a distributed client application 310 may comprise any program, or part of a program, that is configured to use a DSM's interfaces and functionality for any desired purposes, e.g., most often for management of application state. Distributed application 310B in the illustrated embodiment is configured to make use of DSM functionality (specifically, write transaction execution functionality) to monitor the health of the DSM SPC itself. In a more typical example of DSM use, client processes 315A and 315B may represent respective nodes of a distributed storage service application that is configured to receive customer requests over a network and in response, perform various functions on behalf of those customers.

In the illustrated embodiment, a given client process 315 may comprise an execution of user code 320, and DSM client library components 322. For example, client process 315A executes user code 320A and client library components 322A, client process 315B executes user code 320B and client library components 322B, and so on. Different client processes may execute different user code and/or library components in some embodiments. A client library component 322 of the DSM may in some embodiments comprise a software library that exposes one or more programmatic interfaces (such as APIs) to user code 320 for interacting with the DSM SPC 120. In various embodiments, user code 320 of a client process 315 may invoke various methods of the client library components 322 to interact with the DSM SPC 120 over a network, access different constants and/or variables of client library components 322, and/or otherwise access data and functionality of the client library components 322. In some embodiments, the client library components may read data from the DSM SPC, update data in the DSM SPC, and/or listen for events notifications 355 from the DSM SPC. In at least one embodiment, each client process 315 may submit heartbeat messages 350 periodically to the DSM SPC, so that the DSM is informed that the client process remains alive. In one embodiment, the heartbeat messages sent by the monitoring nodes (e.g., client processes 315C and 315D) may be used by the SPNs 122 as evidence of the health of the monitoring cluster. In other embodiments, the SPNs 122 may use timing information of write transactions requested by the monitoring nodes to monitor the health of the monitoring cluster, as described below.

According to the illustrated embodiment, a client process 315 may in general communicate with DSM SPC 120 to, for example, submit asynchronous locking requests of various types on elements of logical registry 160, to set up and receive notifications for caches comprising various registry elements, as described below in further detail. In some embodiments, each SPN 122 of the cluster may be implemented using a different physical and/or virtual machine. In other embodiments, two or more of SPNs 122 may be different software instances or processes executing on the same physical or virtual machine. The set of SPNs 122 may be referred to as a "collective" in some embodiments.

A given client process 315 may communicate with the collective via one of the SPNs 122 in the depicted embodiment. Different client processes may communicate with different nodes in some embodiments. The particular SPN 122 chosen by a client process 315 may depend on the identity of the client, the type of request, and/or other factors. In some embodiments, a client process 315 may maintain affinity to a given SPN 122 once communication and/or another relationship has been established. It may also be possible for a client process 315 that has established affinity with a particular SPN 122 of the DSM collective to switch to another SPN at any time. This may in general be done arbitrarily, in response to a node failure, in response to the node becoming overloaded, in response to a scheduler component indicating that the client should switch to another node, and/or in response to various other events. In one embodiment, as described below in further detail, a particular monitoring node (such as client process 315C) may communicate with more than one SPN during a given iteration of health monitoring operations. As shown in the illustrated embodiment, the various SPNs 122 may communicate with one another via interconnect 333. These network connections may be implemented using various types of networks (e.g., Myrinet, Ethernet, Gigabit Ethernet, etc.) in various topologies (e.g., ring, grid, Torus, bus, etc.).

For simplicity of explanation, many of the embodiments described herein comprise a DSM implemented on a fully-connected cluster of computers, where each node 122 is a different physical machine in the cluster, executes a separate instance of the DSM node software, and can communicate directly with every other node 122 in the collective via a network connection. However, those skilled in the art will appreciate that various other configurations are possible using different physical and/or virtual machines, connected by different network types and/or topologies, as described above.

According to FIG. 3, nodes 122 of the collective may work together to maintain a shared state, e.g., for various client applications, in a logical registry 336. The logical registry 336 may not necessarily be implemented as a separate physical entity, but rather, as a logical entity that may be implemented across multiple nodes 132 of the DSM. For example, in the depicted embodiment, each node 122 may keep a respective local copy 346 (e.g., local copy 346A for node 122A, local copy 346B for node 122B, and so on) of the logical registry 336. Through a consensus protocol, the nodes 122 may agree on state transitions for each node to apply to its local registry copy, thereby collectively maintaining a single logical registry 336. Each node 122 may thus maintain a cached copy of the registry that is valid as of the last registry transition (i.e., update) known at the node. In some embodiments, each transition may be associated with a registry logical timestamp, such as in a monotonically increasing 64-bit integer or counter agreed upon by the collective 120. This timestamp may be a physical or logical time in different embodiments, and may be referred to as the "DSM time" herein. In embodiments where the DSM time is maintained as a counter, it may be incremented each time the registry is updated in some implementations, e.g., each change to the logical registry may result in a change to the DSM time, and each change in the DSM time may indicate that at least one element of the registry was updated. Each node 122 may maintain its own registry logical timestamp 348 (e.g., logical timestamp 348A for node 122A, logical timestamp 348B for node 122B, and so on), indicative of the most recent transition of the logical registry that is reflected in the local registry copy at that node. At any point in time, in some implementations, the value of the local logical registry timestamp 348 at a given node 122 may differ from the value of the local logical registry timestamp of another node; however, if and when two nodes have the same local logical registry timestamp values, the data in their respective local registry copies 346 may be identical (i.e., both local copies of the registry may be guaranteed to have applied the same set of updates). In at least some implementations, each node 122 may also maintain an independent system clock separate from the registry logical timestamps.

Logical registry 336 may include information that may be accessed in a consistent manner by a plurality of the nodes 122. In some embodiments, the logical registry 336 may include several types of elements and associated metadata, such as lock objects, data entries, session objects representing connections to client processes 105, and the like. Some or all of the registry elements may be used to represent application state of the distributed client applications 310. In some embodiments, the DSM may maintain multiple logical registries. In such embodiments, each logical registry may be identified by a unique name. Different logical registries may be used to store data relevant to a corresponding client application or set of client applications in some embodiments. For example, different distributed applications may use respective logical registries separate from one another. In other embodiments, a single logical registry may include elements representing state information of a plurality of client applications. In some embodiments, each of the elements of a given registry 336 (such as locks, data entries, and/or sessions) may be identified by a respective pathname (e.g., "registry1:/companyA/departmentB/objectC" within a namespace, e.g., each element may be identified via a string concatenated from substrings, where each substring represents a respective hierarchical component named using a directory-like naming convention, starting with a root substring (e.g., "registry1:" in the case of the element with the identifier "registry1:/companyA/departmentB/objectC").

Each lock managed using the logical registry 336 may be identified by a respective path in the registry namespace. The logical registry 336 may also include various data entries, each also identified with a respective path. Data entries may comprise information stored to the logical registry by client processes, such as information to be shared with other client processes. For example, when creating a lock, a client process 315 may wish to write some metadata describing the lock into a data entry. In some embodiments, such entries may include a name, value, creation time, and/or a modification time. The time-related information stored in the registry 336 (such as creation time, or modification time) may be expressed using DSM time in some embodiments, and/or using system clock time in other embodiments. In some embodiments, a logical registry may also list named client processes and/or client sessions (e.g., representations of connections between client processes 315 and the cluster 120) recognized by the DSM. Such listings may also include configuration parameters for those client processes and/or sessions. For example, in some embodiments, a named client process may be alternatively listed as either registered, revoked, or forgotten.

The DSM SPC 120 may in general act as a mediator between the client processes 315 and one or more logical registries 336. The client process 315 may interact with a logical registry 336 by submitting transactions to the DSM SPC 120, which may interact with the logical registry 336 on behalf of the client process. Through a read transaction, a client process may read information such as locks, entries, or sessions from the logical registry 336. Using a write transaction, a client process 105 may update information in the logical registry 336. In at least one embodiment, a monitoring node (e.g., client process 315C or 315D) may create or update one or more of the different types of registry elements supported (e.g., locks, sessions, or data entries) as part of its write transaction requests that are used to monitor the health of the DSM SPC. In some embodiments, the DSM SPC may also execute "checks" or "check operations" on behalf of a client process. In a check operation, the DSM SPC 120 may determine whether the context of a transaction that includes the check operation is what the client process expected. For example, optimistic writes may be implemented by checking that an entry has not been modified since a specified DSM time.

Each transaction may have different possible outcomes. In some embodiments, these outcomes may correspond to success-write, success-read, abort, and fail. A success-write outcome may indicate that a transaction that includes at least one write operation was executed successfully, any checks included in the transaction passed, and the registry has been updated. A success-read outcome may indicate that the transaction executed successfully but did not make any changes to the logical registry. An abort outcome may indicate that the transaction was aborted for some reason other than the particular contents of the transaction. In various embodiments, the DSM may abort and/or reattempt a transaction for different reasons. A fail outcome may indicate that the transaction failed, for example, because one or more checks in the transaction failed, a lock creation failed because the lock already exists, the request contained a syntax error, and/or for various other reasons.

The DSM may determine the outcome of various transactions and route event notifications (e.g., as indicated by the arrows labeled 355 in FIG. 3) indicating the outcomes to interested client processes 315. Client processes 315 may register to receive some or all events in some events in some embodiments. In one embodiment, the DSM may be configured to forward all event notifications to every client by default, and to allow each client process to set up various filters to indicate the types of events in which it is interested. In some embodiments, each event notification 355 may be labeled with a physical and/or logical timestamp from which the client process 315 may be able to infer when the corresponding event occurred. For example, in the case of a monitoring node such as client process 315C or 315D, an event notification may indicate that a write transaction requested by the monitoring nodes was committed, which may be considered evidence of the health of the DSM SPC. In some embodiments, if a network disruption occurs among the nodes of the DSM SPC 120, the DSM SPC may become partitioned. The protocol used to make commit decisions for write transactions may require a majority of the SPNs to be connected in some embodiments. Accordingly, if the monitoring node happens to be connected to a particular SPN that now forms part of a minority of SPC nodes that is not involved in commit decisions, the monitoring node may not receive a timely commit event notification, which may suggest that the SPC is not in a healthy state. However, before concluding that the SPC is in fact in an unhealthy state, in such a scenario the monitoring node may first attempt to contact other SPNs, some of which may be able to confirm that the commit did occur, and as a result the monitoring node may in some embodiments be able to generate a health check record indicating that the SPC is in a healthy state (despite the lack of commit notification from the original SPN). Thus, in such an implementation, as long as the DSM is able to make commit decisions, the DSM SPC may be considered healthy, even if some SPNs have been temporarily disconnected from the rest. In other implementations, depending on the details of the CHMP in use, a network partition within the DSM SPC may be considered evidence of a failure, and the monitoring node may generate a health check record indicating that the cluster is in an unhealthy state if even one SPN does not return a commit indication.

As indicated above, in some embodiments client processes 315 (including monitoring nodes 132) may use transactions to read, insert, remove, and/or modify data stored in the logical registry 336. In some embodiments, a transaction may be specified using a stack-based language. Such a transaction may be specified in terms of data tokens and operations, where the data tokens are pushed directly onto a stack and the operations read their inputs from the stack and push results to the stack. After such a transaction is complete, the resulting stack may be sent to the client process.

In some embodiments, the DSM may execute an internal failure detection service (e.g., in addition to the external health monitoring implemented by monitoring clusters). For example, if a given SPN 122 crashed or became otherwise unresponsive, the failure detection service may determine this. In some embodiments, a failure detection service may be executed across the DSM SPC 120 in a distributed manner. In some embodiments, the failure detection service may also determine whether particular client processes 315 have become unresponsive, for example, by monitoring heartbeat messages 350, from various client processes. In at least some embodiments, if connectivity is lost between a client process 315 and a given DSM SPN 122, the client library component 322 of the client process may automatically attempt to establish a connection to a different SPN 122. In at least some implementations, the client process 315 may not be aware of the identity of the SPN to which it is connected.

Figure 4:
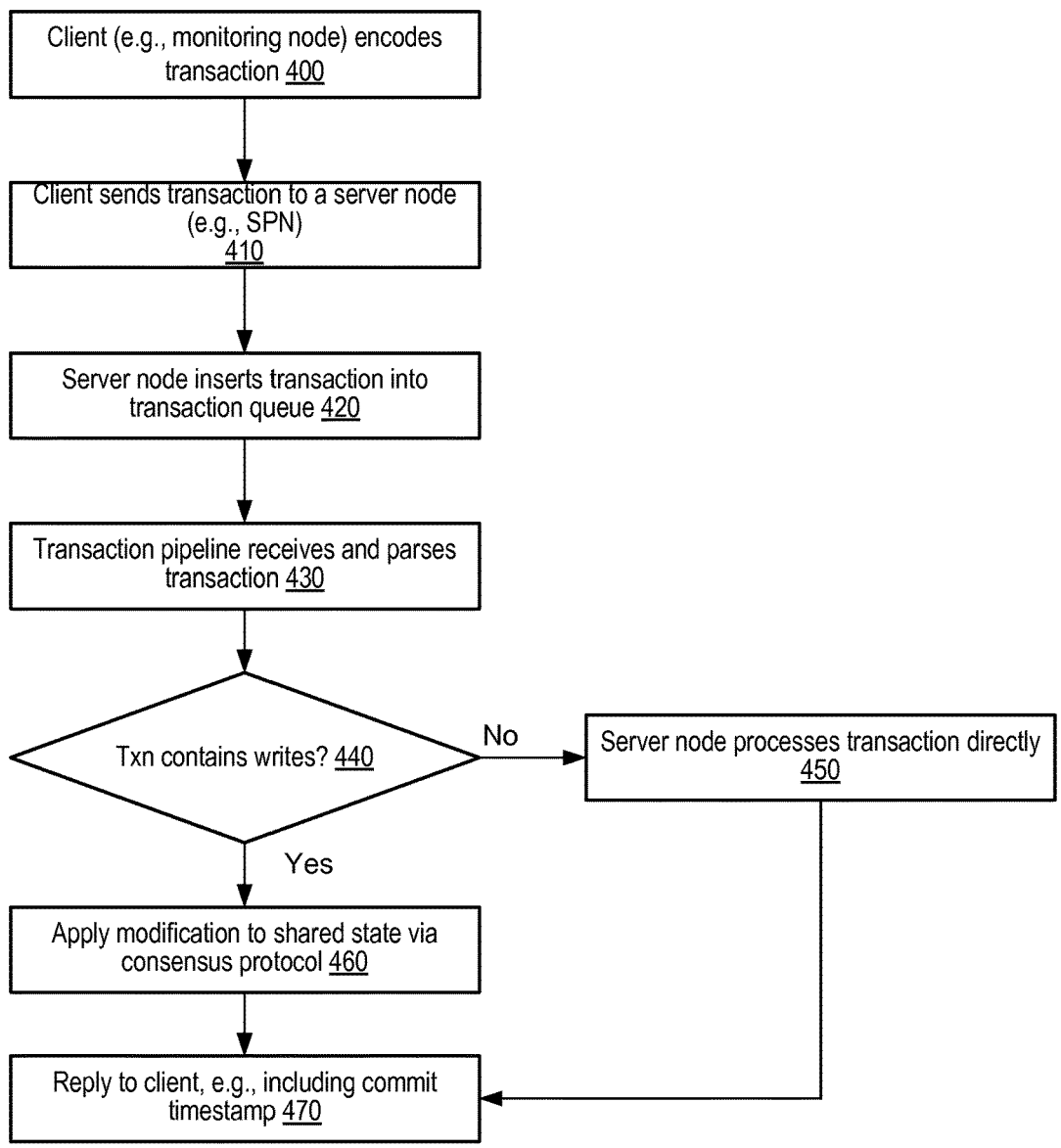
FIG. 4 is a flow diagram illustrating interactions between a client process and a distributed state manager collective to execute a transaction, according to at least some embodiments.

FIG. 4 is a flow diagram illustrating interactions between a client process 315 and a DSM collective 120 to execute a transaction, according to some embodiments. When a client process 315 determines to execute a given transaction on the logical registry 336 (e.g., to update the logical registry 336 to indicate that the client process has acquired a given lock), it may first encode the transaction, as indicated in element 400 of FIG. 4. For example, encoding the transaction may involve invoking one or more library functions of a client library component 322. In some embodiments, the transaction may be encoded using a stack-based transaction language, as described above. After creating the encoded transaction, the client process 315 may wrap the transaction in the body of a network message according to any suitable network protocol, and submit the wrapped transaction to an SPN 122 of the DSM server cluster, as shown in element 410. In some embodiments, the client process may contact any of a plurality of server cluster SPNs 122 of the collective, e.g., in accordance with a node selection protocol.

Upon receiving the wrapped transaction, the SPN 122 may unwrap the message and insert the encoded transaction into a queue in a transaction pipeline, as shown in element 420. The pipeline may represent an ordered processing of transaction requests in some implementations. In some embodiments, several or all of the SPNs 122 of a DSM collective may share the same transaction pipeline. The transaction pipeline may then receive and parse the encoded transaction, as shown in element 430. If the transaction does not contain any write operations to the logical registry (as indicated by the negative exit from element 440) then the DSM SPN 122 may process the transaction directly (as indicated in element 450) and reply to the client with a status message and/or any data requested (as shown in element 470).

If however, the transaction does contain write operations, as indicated by the affirmative exit from element 440, then the DSM may modify the logical registry 336. A transaction that includes writes may be referred to herein as a "modifying transaction". Since multiple DSM SPNs 122 may collectively maintain the registry, the DSM node that received the transaction request may apply the writes by initiating a consensus protocol (e.g., Paxos) among these multiple SPNs of the collective, as shown in element 460, before replying to the client with the result, as shown in element 470. The nodes collectively deciding whether the writes should be applied may be termed a "jury" herein. Many variations may be possible for executing write operations to the shared logical registry using consensus protocols. In some embodiments, the receiving node may first execute the transaction locally without applying the write operations to the logical registry and then, only after all writes of the transaction are known, apply the changes to the shared registry via a consensus protocol. For example, as the node 122 executes a transaction, the node may create a change request in addition to the normal stack. The change request may include a list of logical registry items read by the transaction execution (i.e., the read-set) and a list of writes to perform (i.e., the write-set). When the node finishes executing the transaction and the write-set is complete, then the modifications in the write-set may be made to the logical registry via a consensus protocol, e.g., employing a jury. In some embodiments, the DSM may also confirm that various data items in the read-set have not been modified before committing the changes in the write-set.

In some embodiments, performing the writes via a consensus protocol may include passing the completed change request to a predetermined one of the DSM SPNs (which may be termed a "primary" or "primus" node herein), directly or via a queue, for processing. For example, the primus may accept a completed change request and act as the leader in a Paxos protocol to reach consensus on committing the changes to the shared logical registry. In some embodiments, apart from its role in coordinating consensus protocol activities (e.g., in receiving change requests, proposing changes to the jury as described below, and/or communicating jury decisions), the primus may be otherwise similar or identical to other nodes 122 of the DSM. In various embodiments, the primus may be selected from any of the nodes according to any suitable protocol, such as nomination or self-nomination, with or without election. If a primus fails during DSM operation, a new primus may be selected in some embodiments.

Figure 5:
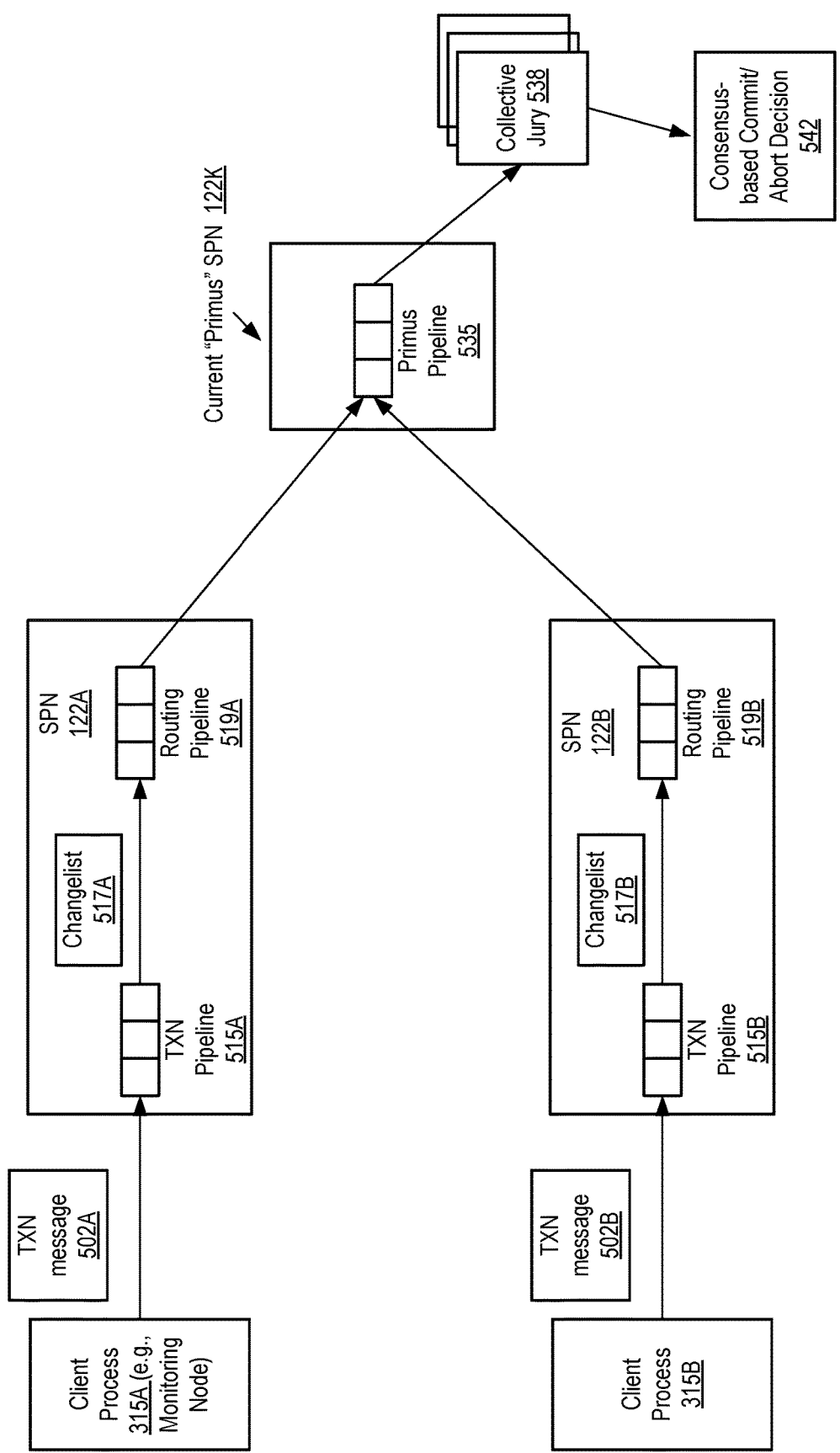
FIG. 5 illustrates example steps that may be taken by the distributed state manager to process modifying (write-containing) transactions, according to at least some embodiments.

FIG. 5 illustrates example steps that may be taken by the DSM to process modifying (write-containing) transactions, according to at least some embodiments. In the illustrated embodiment, client process 315A (such as a monitoring node 132A) generates a transaction message 502A for its transaction, which may comprise a list of operations (including at least one write, update, or delete operation) to perform on data in the logical registry 336, and communicates it to a DSM SPN 122A. The transaction message 502A may be encoded using the client library 422A, and may be transmitted over any appropriate type of network connection. As noted earlier, the transaction may be encoded using a stack-based transaction language in some embodiments. A different client process 315B may encode its own modifying transaction analogously, and transmit it in the form of transaction message 502B to an SPN 122B of the SPC 120. In some embodiments, different client processes 315 may submit their transactions to the same SPN 122; the target node to which a transaction message is sent may be determined using a number of different techniques in different embodiments. In some embodiments, client library component 422 may be responsible for determining which of the SPNs 122 are currently accessible, and selecting from among them using a random-selection policy, a round-robin policy, a least-recently-used policy, or a different selection policy. In other embodiments, the user code of a client process may indicate preferences for selecting SPNs, and the client library may take such preferences into account. As noted earlier, in at least some embodiments the client library component 422 may automatically re-connect to a different DSM SPN 122 if connectivity to one DSM SPN is lost.

The DSM SPN 122 that receives the transaction message 502 may decode the transaction and insert it into a queue maintained for its transaction pipeline 515 (e.g., transaction pipeline 515A for SPN 122A, or transaction pipeline 515B for SPN 122B). In some embodiments, if the transaction happened to be read-only, the values of the various registry elements to be read may be obtained from the local copy of the registry, and returned to the client, without any further interactions with the other nodes of the server cluster. Thus, the receiving DSM SPN 122 may commit read-only transactions independently of other nodes, and may assign a commit timestamp (e.g., the value of the local copy of the registry logical timestamp or DSM time 348) to the transaction. In the illustrated example, however, each transaction comprises at least one write/update/delete operation. Because the transaction received via message 502A includes a modifying operation, a change list 517A may be constructed and populated for the transaction. For example, SPN 122A may first construct an empty stack and an empty change list 517A and initiate a transaction processor. The processor may execute the operations of the transaction in sequence, popping each parameter from the stack, reading information from the local copy of the registry, and pushing results back to the stack. During this transaction-processing phase, the SPN may avoid writing directly to the registry, since the collective must agree upon changes to the registry. Instead, the SPN may write state changes into the change list 517A that it may submit to the entire collective later. The change list 517A may also include check operations to ensure, for example, that the context of the transaction remains as expected (e.g., to ensure that values of registry elements that are included in a read-set of the transaction have not been changed as a result of other modifying transactions). Similarly, a change list 517B may be constructed for client process 315B's transaction at SPN 122B.

In different instances, the processing may terminate in different states. For example, the transaction processing may terminate in an error state, indicating that the transaction failed. Alternatively, the transaction processing may terminate in a failed state, indicating that a check failed (e.g., data in the read-set was modified). For modifying transactions, the transaction processing may complete in a pending state, indicating that the operations of the transaction were completed successfully, but the change list is not empty.

If the transaction processing completes in a pending state, then to complete the transaction, the DSM collective must agree to modify the logical registry 336 according to the change list 517 in some embodiments. A given DSM SPN 122, such as 122A, may attempt to get the DSM collective to agree to commit the changes to the logical registry 336 by initiating a consensus protocol. The SPN 122 may initiate the consensus protocol by sending the change list 517 to a DSM SPN in the collective that has been predetermined as the leader. In the illustrated embodiment, an SPN 122K is designated as the current primary or "primus" node, and the change list 517A may be placed in a routing pipeline 519A for transmission to the primus node 122K. Similarly, change list 517B may be placed in a routing pipeline 519B for transmission to the primus node 122K. The primus node 122K may have its own pipeline 535 in which change lists from various other nodes 122 are enqueued and processed. The primus may then propose the changes in a given change list 517 to other nodes in the collective 120 via a consensus protocol, such as Paxos. In some embodiments, the primus may propose the change to only a subset of the SPNs 122 in the collective, which may be referred to herein as the collective jury 538. Once the collective (e.g., either all the SPNs 122, or a subset of the nodes that forms the jury) decides on whether to make the change(s) of a change list to the logical registry 336 (e.g., when a consensus-based commit or abort decision 542 is reached), the primus may notify the particular SPN 122 from which the change list was received of the outcome. In other embodiments, the SPN 122 that sent the change list 517 may discover the result by reading its updated copy of the registry rather than by receiving an explicit indication from the primus node. The SPN 122 may then return one or more results of the transaction to the corresponding client process 315, and may indicate the commit time of the transaction (e.g., the DSM time when the transaction's changes were committed to the logical registry). In some embodiments the transaction results may also be encoded using a stack-based language, and decoded by the client library component 322 of the client process. In at least some embodiments, in the event a given transaction does not get committed, the transaction may in general be retried, either by the receiving SPN 122 (the node that received the transaction message 502 from the client process 315) or by the client process 315 resubmitting the transaction. Different retry policies may be in effect in different embodiments, governing for example if, when, and by which entities transactions are to be re-attempted. As described below in further detail, the details of the cluster health monitoring policy in effect for monitoring the DSM SPC may determine how a monitoring node responds to indications that a transaction was not committed.

In at least one embodiment, a monitoring cluster (such as distributed application 310B of FIG. 3) may designate a particular path or set of paths of the registry 336 for monitoring the DSM SPC's health. Each monitoring node 132 may, for example, submit a transaction to a particular SPN 122, containing at least one write operation to a registry element with one of the designated paths, as designated time intervals (e.g., once every X seconds, as determined by the CHMP in use). If the transaction succeeds (e.g., a commit notification is received), the monitoring node 132 may deduce that the DSM SPC is in a healthy state, and generate a corresponding health check record indicating the healthy state. In some embodiments, as long as any update notification is received within a specified time period after the transaction request is submitted (where the time period may also be determined by the CHMP in use), even if an abort or failure indication is received rather than a commit notification, the monitoring node may still determine that the DSM SPC is in a healthy state. If no notification is received within the specified time period, in some embodiments the monitoring node may take other actions (e.g., submitting additional writes to the same SPN, or submitting additional writes to other SPNs), before determining to generate a health check report indicating that the DSM SPC is in an unhealthy state.

Meanwhile, in some embodiments, one or more SPNs of the DSM may be designated to monitor the health of the monitoring cluster, e.g., according to a different CHMP. In some embodiments, determining the health state of the monitoring cluster may be based at least in part on a result of one or more computations performed at a particular node (e.g., SPN) of a service-providing cluster. Such a determination may be in accordance with a second CHMP that differs from the first CHMP employed in determining the health state of the service-providing cluster. In some embodiments, the one or more computations performed at the particular node of the service-providing cluster may include an analysis of a probe issued by the particular node of the service-providing cluster to one or more selected nodes of the monitoring cluster. In some embodiments, one or more SPNs may check how recently one or more of the registry elements were updated by any one of the monitoring nodes (since each update to the registry may include a logical and/or physical timestamp indicating when the update occurred). In some embodiments, as long as the meta-monitoring SPNs can verify that at least one update, from any one or a subset of the monitoring nodes, was applied or requested within the last Y seconds (the time threshold may be a parameter of the CHMP used for monitoring the MC), the monitoring cluster may be considered to be in a healthy state, and a health check record indicating this may be generated. In other embodiments, an MC may be considered healthy only if updates were received from N MC nodes within a specified time interval, where N may be a configurable parameter. Thus, collectively, using the transaction functionality of the DSM and existing registry implementation and timestamp facilities, it may be possible for a monitoring cluster to track the health state of the DSM, and for one or more nodes of the DSM to track the health state of the monitoring cluster. The overhead added to the DSM SPNs may be quite low in implementations where they may only need to check the most recent updates to a few registry entries once every few seconds. It is noted that although the use of a consensus-based protocol for write commit decisions at the SPC has been described for some embodiments above, in other embodiments, any suitable other protocol may be used that indicates that the SPC is in an acceptable health state if a write succeeds. It is also noted that at least in some embodiments, the reciprocal monitoring functionality described above may be used across organizational boundaries—e.g., the SPC may be owned/managed by one entity, and the MC by another entity. In some such embodiments, the decisions on what actions (if any) are to be taken in response to detecting a particular health state of an SPC or an MC may be made by health aggregators that are owned/managed by one of the two entities (or even by a third entity)—e.g., either the aggregators could be owned/managed by the same entity that owns/manages the SPC, or by the same entity that owns/manages the MC, or by a third entity.

Methods for Reciprocal Monitoring Between SPCs and MCs

Figure 6:
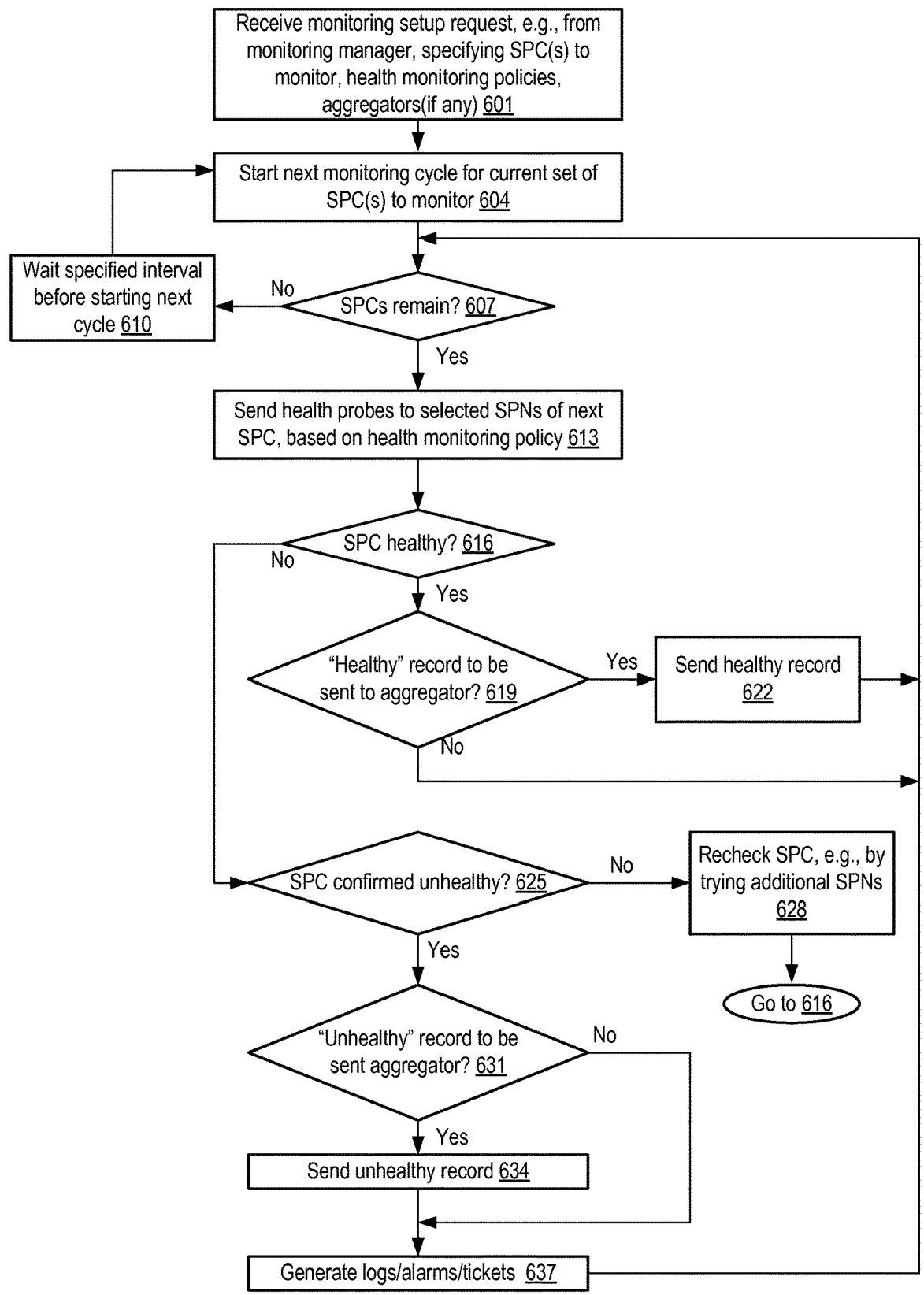
FIG. 6 is a flow diagram illustrating aspects of the operation of a node of a cluster configured to monitor health state of one or more service-providing clusters, according to at least one embodiment.

FIG. 6 is a flow diagram illustrating aspects of the operation of a node (e.g., a monitoring node 132) of a cluster (e.g., an MC 130) configured to monitor health state of one or more service-providing clusters, according to at least one embodiment. (In the following description, the actions taken by the monitoring agent 182 of the MN 132 may be referred to as the actions taken by the MN 132 itself, i.e., the term "monitoring node" may be used as a shortened version of "the monitoring agent at the monitoring node".) In the illustrated embodiment, a given MN 132 may be responsible for monitoring several SPCs iteratively, e.g., it may, during a given monitoring cycle, submit probes to SPC 120A, then to SPC 120B, then to SPC 120C, and so on, until it has covered all the SPCs for which it is responsible. As shown in element 601, the MN 132 may receive a monitoring setup request, e.g., from a monitoring manager 180, specifying the SPCs it is to monitor, the details of the cluster health monitoring policies (CHMPs) for each of the SPCs to be monitored, which (if any) health aggregators are to be notified and under what conditions, and so on. The details of a given CHMP may, in different embodiments, indicate the mechanism to be used for health probes (e.g., the submission of write transactions as described above, or the invocations of one or more health monitoring APIs), how the results are to be interpreted (e.g., which types of results imply a healthy state, and which suggest an unhealthy state, of the monitored cluster), the format and/or contents of the health check records to be generated, how the health check records are to be stored or transmitted (e.g., to health aggregators), what actions are to be taken in response to an indication that the monitored SPC is in an unhealthy state, and so on.

Having received the details of the various CHMPs to apply, the MN 132 may start its next monitoring cycle for the current set of SPCs 120 it is to monitor (element 604 of FIG. 6). The set of SPCs 120 to monitor may change over time, e.g., as some SPCs fail, are taken offline, or are reconfigured, or in response to new configuration instructions from the monitoring manager 180. If there are no SPCs remaining to be monitored in the current cycle (as determined in element 607), the MN 132 may wait a specified interval before starting its next cycle (element 610), where the interval may depend for example on parameters of the various relevant CHMPs. If there are SPCs remaining to be monitored in the current cycle (as also determined in element 607), the MN 132 may send health probes to one or more SPNs (element 613) of the next SPC remaining. The number of SPNs to which probes are sent may depend on the CHMP for that SPC.

If the result(s) of the probe(s) indicate that the SPC is in a healthy state (for example, in the case where the SPC is a distributed state manager of the type described above and a write transaction commit notification is received), as determined in element 616, the MN 132 may determine whether a record indicating the healthy state is to be sent to a health aggregator 150 (element 619). In some embodiments, health check records may be sent to health aggregators only in cases where the monitored SPC is deemed to be in an unhealthy state. In other embodiments, health check records may have to be sent to health aggregators for both unhealthy and healthy states, while in some embodiments the MN 132 may be required to initiate corrective actions in respond to determining that the SPC is in an unhealthy state, and only send healthy state indicators to aggregators. If a record indicating that the SPC is healthy is to be sent, the MN may transmit the record to the health aggregator (element 622) and move on to the next SPC 120 to be checked during the current cycle (element 607 onwards).

If the result(s) of the probe(s) indicate that the SPC appears to be unhealthy (as determined in element 616), in the depicted embodiment, the MN 132 may be configured to confirm, e.g., using one or more guidelines or rules of the CHMP, that it should generate a record indicating that the SPC is not in a healthy state. The confirmation may, for example, involve submitting multiple probes, trying to probe multiple SPNs, waiting for some period of time before retrying probes, contacting other monitoring nodes to determine whether they can confirm the apparent problem, and so on. If the MN cannot yet confirm that an unhealthy record is to be generated (as determined in element 625), the MN in the depicted embodiment may recheck the health of the SPC, e.g., by probing additional SPNs (element 628), and then go through the operations illustrate in elements 616 onwards.

If the MN 132 confirms that, as far as it is possible to determine from its probes, the SPC is indeed not in a healthy state (as determined in element 625), the MN may next determine whether a record indicating the unhealthy state is to be sent to a health aggregator 150. If a record is to be sent, the MN may transmit the record (element 634). Otherwise, at least in some embodiments, the MN may take one or more actions in accordance with the CHMP for the unhealthy SPC 120—e.g., reboots/restarts may be initiated, one or more alarms may be raised, a support ticket may be raised automatically, one or more text messages or e-mails may be sent to system administrators, log messages may be written, and the like (element 637). In some embodiments such actions may be the responsibility of the health aggregators. That is, MNs may be responsible for notifying the aggregators, but the decisions about whether alarms are to be generated or support tickets are to be issued may be made by the health aggregators, for example based on input from multiple MNs, as described below in further detail with reference to FIG. 9. After the current SPC has been probed, the MN may proceed to the next SPC of the current cycle in the embodiment depicted in FIG. 6 (i.e., the operations illustrated starting at element 607 may be repeated). In some embodiments, the MN may monitor multiple SPCs in parallel, instead of using a serial approach.

Figure 7:
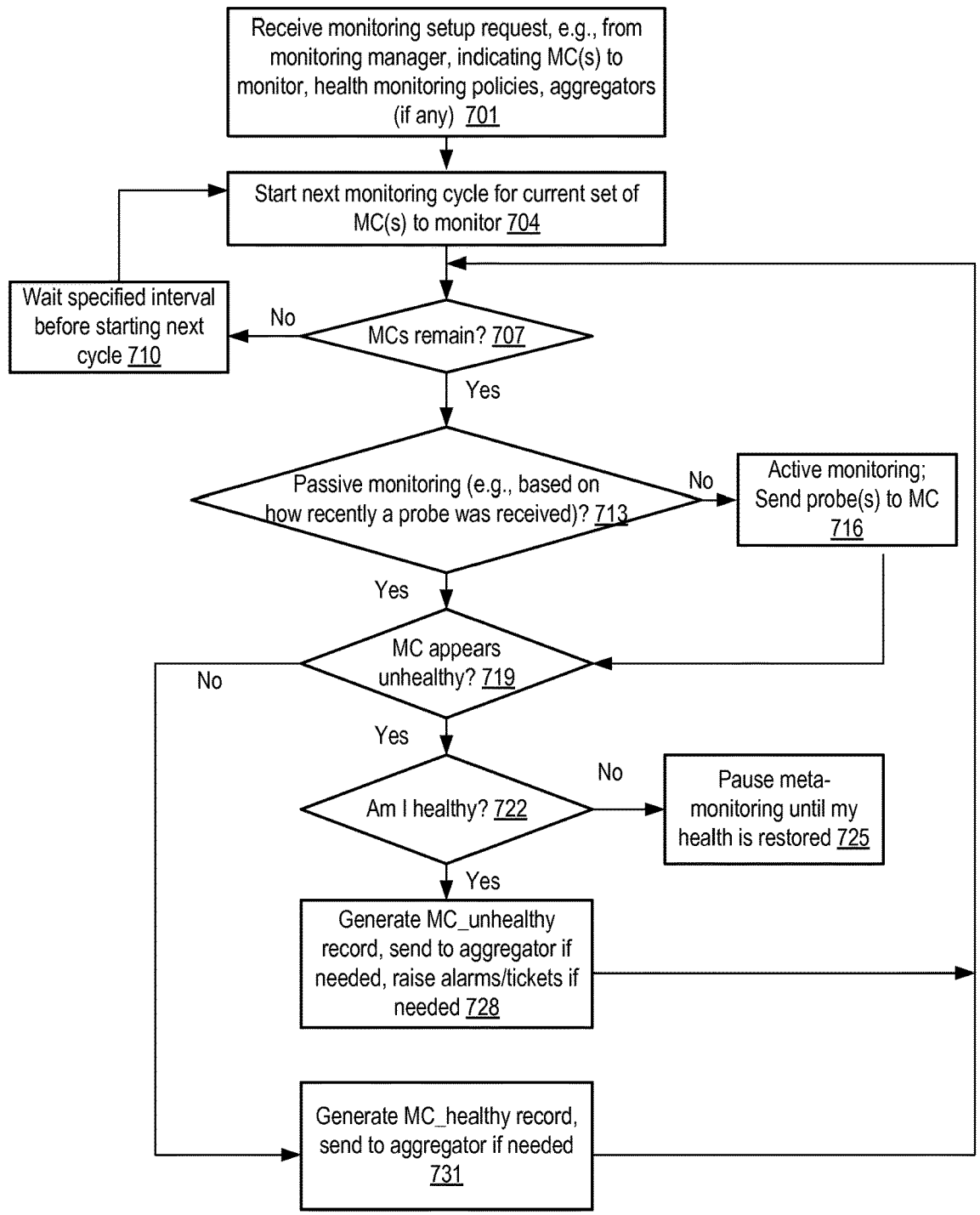
FIG. 7 is a flow diagram illustrating aspects of the operation of a node of a service providing cluster configured to monitor health state of one or more monitoring clusters, according to at least one embodiment.

FIG. 7 is a flow diagram illustrating aspects of the operation of a node of a service providing cluster (i.e., an SPN 122) configured to monitor health state of one or more monitoring clusters, according to at least one embodiment. As shown in element 701, the SPN may receive a monitoring setup request, e.g., from a monitoring manager 180, indicating the MCs and MNs that the SPN is to monitor, various details of the CHMPs to be used, and information about any health aggregators 150 to be informed regarding the health status of the MCs. (In the following description, the actions taken by the meta-monitoring agent 186 of the SPN 122 may be referred to as the actions taken by the SPN 122 itself, i.e., the term "service providing node" may be used as a shortened version of "the meta-monitoring agent at the service providing node".) The SPN may start its next monitoring cycle for the current set of MCs for which the SPN is responsible (element 704). If all MCs have been checked during the cycle, the SPN may wait a specified interval in the depicted embodiment before starting its next monitoring cycle, e.g., based on the CHMPs in effect.

If at least one MC remains to be monitored, the SPN may determine what kind of monitoring is to be done for the next MC, as shown in element 713. A number of different monitoring approaches may be possible in some embodiments. For example, the SPN 132 may determine, based on the CHMP in use, whether the health state of the next MC is to be monitored passively (e.g., using information that the SPN already has access to, such as the write transaction timing information discussed earlier, generated as a result of probes sent by MNs in some embodiments) or whether the SPN is to send probes of its own to the MNs of the MC. In embodiments where timestamps of events initiated by the MNs are available, the SPN may not have to do any proactive monitoring, but may simply be able to inspect the timestamps to see how recently an MN was active. In one embodiment, in the DSM SPC case, the MNs may submit, as their probes to monitor the SPC health, write transactions directed at some directory or element set of the registry. Whenever a write transaction is committed to the registry, a timestamp indicative of the commit time may also be saved in the registry, e.g., together with the updated value being written. If the SPNs were informed of the location of the registry elements being used for probes (e.g., during the setup operations of element 701 of FIG. 7), in one implementation the SPN(s) responsible for monitoring the MC's health may simply check how recently a write to one of those registry locations was committed, and if any such write were committed within a time window such as the previous X seconds (where X may be specified in the CHMP being used), the MC's state may be deemed healthy. In at least some implementations, and depending again on the CHMP, if even one MN remains alive, the MC may be considered healthy; in other embodiments, a certain minimum number of MNs may have to be detected as being active in order for the MC state to be considered healthy. In some embodiments, the SPN monitoring the MC may use logical write commit timestamps (e.g., by comparing the current registry logical timestamp to the timestamp of the most recent write(s)) for health state determination, and in other embodiments clock times may be used. If active monitoring involving probes is required (as detected in element 713), the SPN may send one or more probes to one or more MNs (element 716), as per the CHMP in use. For example, in some embodiments the SPN may send health status queries to the MNs. In at least one implementation, the MC may itself implement write transactions in a manner similar to that described above, so an SPN may also submit write transactions as probes.

If the probe results indicate that the MC appears to be healthy (e.g., if passive monitoring is used, and one or more writes were received from one or more MNs of the MC within an acceptable time window specified in the MCHP), as determined in element 719, in the depicted embodiment the SPN may generate a health check record indicating that the MC is healthy (element 731), and send the record to a health aggregator 150 if needed. If the MC appears to be unhealthy, as also determined in element 719, the SPN may in the illustrated embodiment first attempt to determine whether it (i.e., the SPN) itself is healthy (element 722). This check may be performed because, if for example the SPN itself is in a state in which messages from the MNs cannot reach it, e.g., as a result of network partitioning, the monitoring attempted by the SPN may lead to false negatives. That is, the MC may appear to be in an unhealthy state because the SPN is in an unhealthy, isolated, unreachable, or partitioned state, so the monitoring by the SPN may not be reliable. Accordingly, if the SPN is able to determine that its own state is compromised or unhealthy, in the depicted embodiment the SPN may pause its meta-monitoring activities until its own health state is restored (element 725). (It is noted that similar "Am I healthy" checks may be performed by MNs when they detect an apparent problem at SPNs, in some embodiments). If the SPN determines that it (the SPN) is in a healthy state (element 722) when it appears that the MC is in an unhealthy state, the SPN may generate a health check record indicating the apparent state of the MC (element 728). Various other actions may also be taken by the SPN, depending on the CHMP in place, such as sending the health check record to one or more health aggregators, writing log messages, raising alarms or support tickets, rebooting/restarting MNs, and the like. After the current MC has been checked, the SPN may proceed to the next MC of the current cycle in the embodiment depicted in FIG. 7 (i.e., the operations illustrated starting at element 707 may be repeated). In some embodiments, the SPN may monitor multiple MCs in parallel, instead of using a serial approach.

Figure 8:
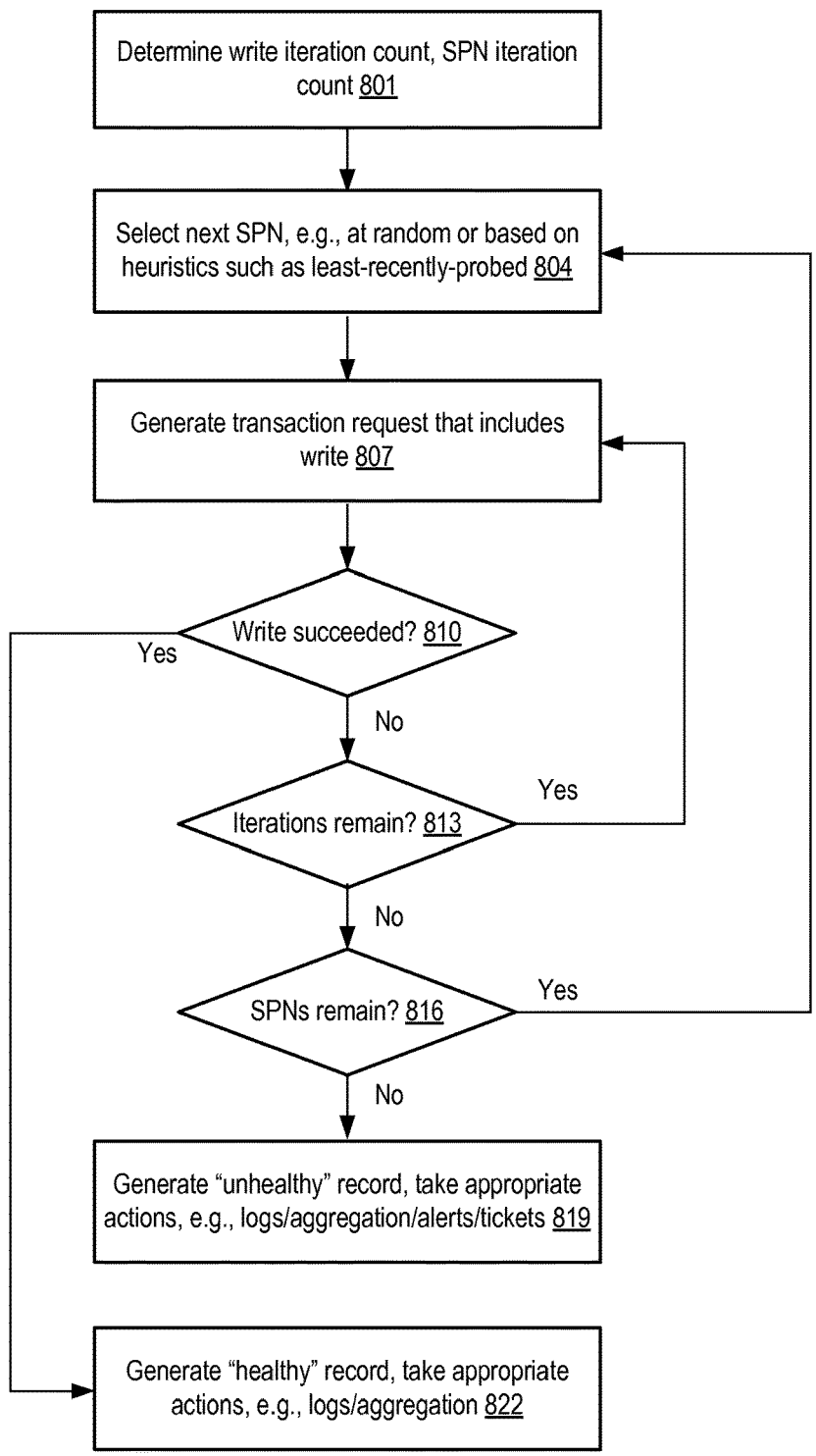
FIG. 8 is a flow diagram illustrating aspects of the operation of a monitoring node configured to use write transactions iteratively to monitor the state of a service-providing cluster, according to at least one embodiment.

FIG. 8 is a flow diagram illustrating aspects of the operation of a monitoring node configured to use write transactions iteratively to monitor the state of a service-providing cluster, according to at least one embodiment. As described above, in some embodiments the SPC 120 being monitored may implement a distributed state manager that uses a consensus-based protocol to coordinate write operations to a registry, and a MN 132 may use write commit notifications as evidence that the SPC is in an acceptable state. The definition of "healthy state" or "acceptable state" may vary from one SPC to another, and at least in some embodiments the SPC (such as a DSM SPC) may be considered healthy as long as at least some minimum number of SPNs remain active. In many environments, there may be substantial costs associated with raising alerts, support tickets and the like, so it may be advisable to reduce the likelihood of false alarms as much as possible. In order to reduce the probability of false negatives (i.e., to reduce the likelihood that a health check record indicating that the DSM SPC is in an unhealthy state is generated when it is actually functional), in the embodiment depicted in FIG. 8, an MN 132 may submit write transactions iteratively. Two types of iterative probing may be implemented to try to confirm that the DSM SPC is in an unhealthy state: (a) multiple write transactions may be attempted to the same SPN 122, and (b) additional SPNs 122 of the SPC 120 may be probed if the first one fails to return commit notifications for all the write probes submitted to it. If a commit notification is received for any of the attempted writes, the DSM SPC 120 may be considered to be in a healthy state in the depicted embodiment, and the MN 132 may exit its probe iterations. The CHMP in use may govern exactly how may write transactions are to be submitted per SPN 122, and how many SPNs are to be probed if the first one does not respond with a commit notification.

As shown in element 801, at the start of its monitoring of a given SPC 120, the MN 132 may determine the iteration parameters—e.g., how many writes are to be attempted before giving up on an apparently unresponsive SPN 122, and how may SPNs 122 are to be probed before giving up on an apparently unresponsive SPC 120. The MN may select the next SPN to probe (element 804), e.g., at random or using some algorithm or heuristic (e.g., choosing the SPN 122 that was least-recently-probed, or most-recently-probed) that may be specified in the CHMP being used. The MN 132 may then generate a write transaction in some embodiments, e.g., to the registry element or elements being used for the probe, using the techniques described earlier with reference to FIGS. 3, 4 and 5. If the write succeeds, e.g., if the MN 132 receives a notification indicating that the write was committed (as detected in element 810), a health check record indicating that the SPC 120 is in a healthy state may be generated (element 822), and additional operations such as logging, or sending the health check record to an aggregator may be performed in some embodiments.

If an indication of the success of the write is not received (e.g., within a time window indicated in the CHMP), as also detected in element 810, the MN 132 may check whether one or more write iterations remain for the SPN 122 being probed. If the write iteration count has not been exhausted (as detected in element 813), the MN 132 may try more write transactions in a loop (e.g., with some delay between successive writes, based on the CHMP) (element 807 through element 813), until either a write succeeds or the iteration count is exhausted. If the iteration count for one SPN 122 is exhausted, the MN may check its second iteration parameter in the depicted embodiment—i.e., whether more SPNs remain to be probed. If the SPN iteration count has not been exhausted, as determined in element 816, the MN may start iteratively probing the next SPN 122 (operations of element 804 onwards). If both types of iterations are exhausted and a write still has not succeeded, the MN 132 may generate a health check record indicating that the SPC is in an unhealthy state (element 819), and take any additional actions specified in the CHMP, such as generating log records, transmitting the health check record to a health aggregator 150, and/or generating alerts or support tickets. If the MN were responsible for monitoring more than one SPC, it may proceed to probing the next SPC after generating the health check record for the current SPC.

It is noted that the type of iterative approach illustrated in FIG. 8 may be used with other types of probes in some embodiments, such as read-only health-checking API calls; e.g., in an embodiment where the MN sends an "ARE_YOU_HEALTHY" query as a probe, expecting an "I_AM_HEALTHY" response, several such queries may be sent iteratively to one SPN, and then to other SPNs, before an unhealthy record is generated for the SPC. In some embodiments, in addition to monitoring whether the SPC remains functional, the MNs 132 may also be responsible for generating performance records—e.g., an MN 132 may keep track of how long it is taking to complete write transactions in one embodiment, and may also submit read-only transactions to determine how long reads are taking. Such transaction performance metrics may also be passed on to health aggregators 150, and/or to monitoring manager 180 in some embodiments, so that for example if the performance characteristics of the SPC's service are found to be unsatisfactory, remedial actions may be taken.

Health Aggregators

Figure 9:
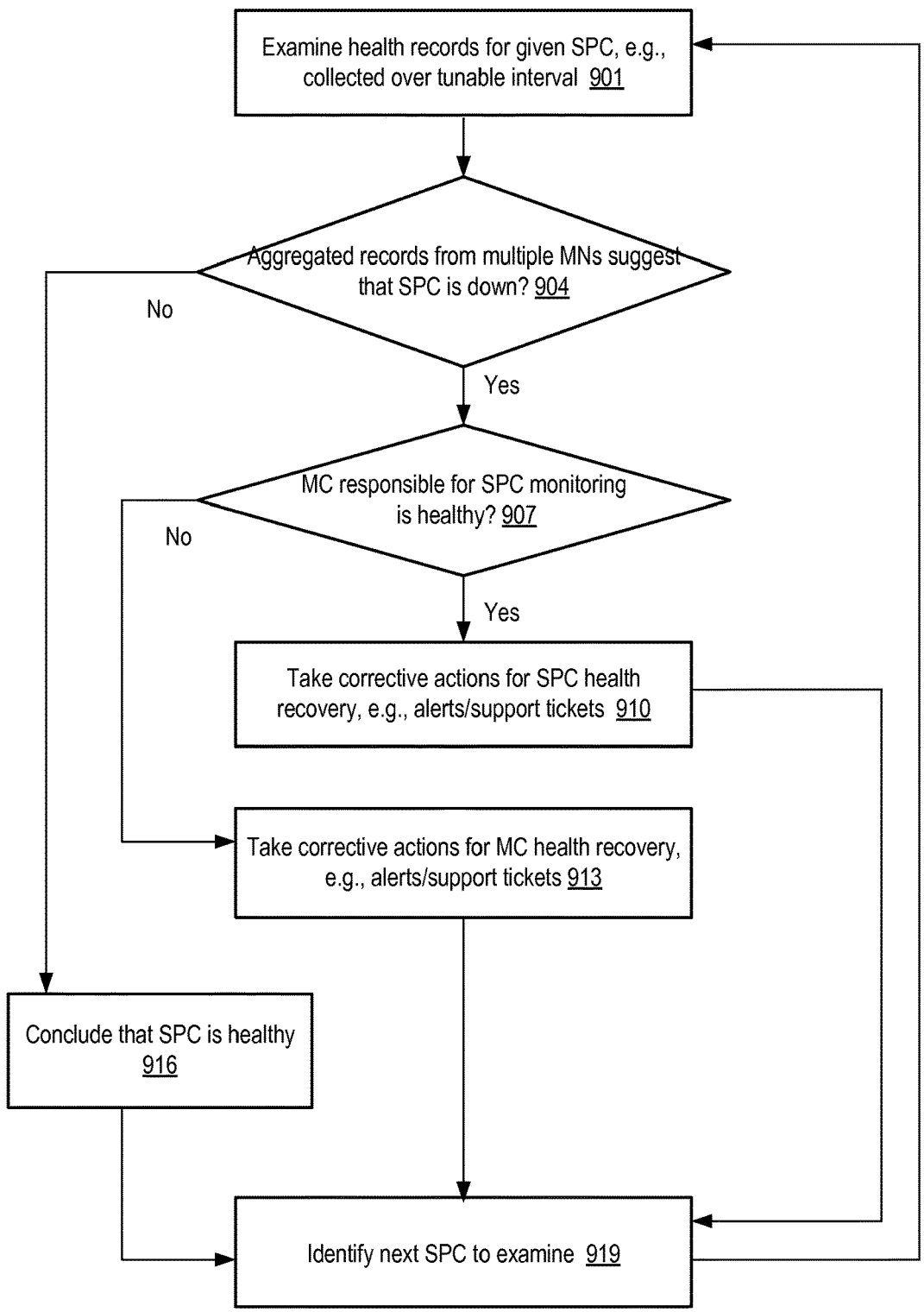
FIG. 9 is a flow diagram illustrating aspects of operation of a health aggregator, according to at least one embodiment.

FIG. 9 is a flow diagram illustrating aspects of operation of a health aggregator 150, according to at least one embodiment. In some implementations, health aggregators 150 may be responsible for collecting health check records from several MNs 132 of one or more MCs 130 for a given SPC 120, and taking actions (such as raising support tickets or alarms) based on the consolidated information from several sources. As shown in element 901, a health aggregator may collect health check records of a given SPC 120, e.g., over a time interval specified in the CHMP used for that SPC. The aggregator 150 may collect data over several minutes, for example, to ensure that temporary network problems do not influence its decisions too frequently. If aggregated data from several MNs 132 of a particular MC 130 indicate that an SPC is down or unhealthy (as determined in element 904), in the depicted embodiment the aggregator may try to ascertain whether the MC 130 is itself in a healthy state. In order to check the state of the MC 130, the aggregator may consult health check records for the MC collected from one or more SPNs responsible for monitoring the MC 130 in some embodiments.

If the MC's health cannot be verified, or if the MC is confirmed to be in an unhealthy state, the aggregator may take corrective actions to restore the health of the MC (element 913), such as generating alerts, support tickets, initiating restarts, and the like. If the MC is found to be functional, the aggregator may take similar actions to restore the health of the SPC identified as being in an unhealthy state (element 910) in the depicted embodiment. If the aggregated records from several MNs, taken together, do not confirm that the SPC is in an unhealthy state (as determined in element 904), even if some subset of the records collected appear to indicate that the SPC may be unhealthy, the aggregator may conclude that the SPC is in a healthy state (element 916) and proceed to examine the records collected for other SPCs (element 919). The aggregator 150 may thus serve as an additional source of confirmation regarding SPC and MC state, so that individual health check records from one MN are compared with health check records from other MNs before potentially expensive/disruptive actions like support tickets, alerts, or node restarts are attempted in some embodiments. As noted above, aggregators 150 may also collect performance indicators from the various MNs regarding the responsiveness of the service being implemented at an SPC 120, and may use such performance data to initiate other actions such as automated tuning of the SPC in some embodiments. Health aggregators may not be implemented in some embodiments, i.e., health states may be determined by the MNs (for SPCs) and SPNs (for MCs) without aggregating health check records.

Figure 10:
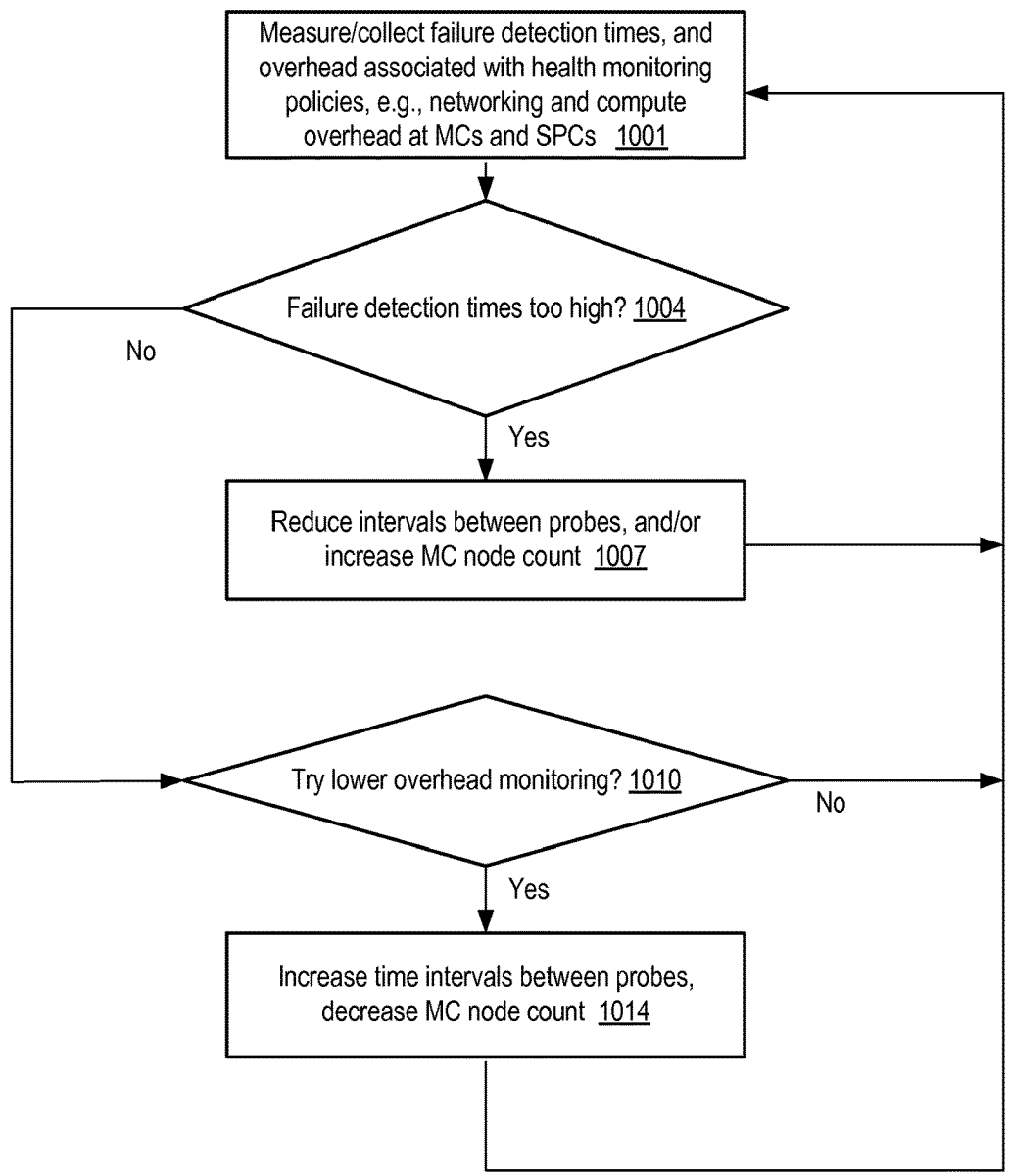
FIG. 10 is a flow diagram illustrating operations that may be performed to auto-tune parameters of a cluster health monitoring policy, according to at least one embodiment.

In at least some embodiments, some of the parameters governing cluster health monitoring may be tunable, such as the write iteration counts discussed above, the number of MNs in an MC, and so on. FIG. 10 is a flow diagram illustrating operations that may be performed to auto-tune parameters of a cluster health monitoring policy, according to at least one embodiment. In the depicted embodiment, a service level agreement (SLA) may be in effect, indicating for example, how quickly SPC failures or unhealthy states are to be identified and/or how quickly such problem states are to be corrected. An entity of the provider network, such as a monitoring manager 180 responsible for overall configuration of various MCs, or a health aggregator 150, may be configured to measure or collect SPC failure detection times, as well as the overhead associated with the failure detection (such as the network traffic generated by various probes or health-related API calls, and/or the CPU usage associated with health monitoring) (element 1001). If, over some time period, the failure detection times are found to be too high (e.g., as compared to the SLA requirements), or approaching the SLA requirements (as detected in element 1004), automated tuning actions of one or more types may be attempted to speed up the failure detection (element 1007), such as reducing the time intervals between probes, or increasing the number of MNs monitoring the SPC. In some embodiments, MNs may be established or moved closer (i.e., in terms of network latency) to the SPNs being monitored, to try to speed up failure detection.

If the failure detection times are satisfactory (as also detected in element 1004), the entity responsible for auto-tuning may determine whether it is worthwhile to try to lower monitoring overhead (element 1010). Depending on the resource constraints of the devices being used for monitoring, and the level of resource utilization at the SPNs, it may not always be worthwhile to change the CHMP settings to reduce monitoring overhead. If a decision is made to try to reduce overhead (element 1010), any of several tuning changes may be attempted in different embodiments: for example, the time interval between probes may be increased, the number of MNs may be reduced, and so on. After any automated tuning changes are made, monitoring of failure detection times and overhead may be resumed (element 1001), and auto-tuning decisions may be revisited after more metrics are collected.

Use Cases

The techniques implemented may be used in any distributed networking environment where clusters are established to provide various types of services. They may be especially useful when certain core infrastructure services (which may be termed "Tier-1" services in some environments), such as the state management service described, are implemented using clusters. Failures of the core services, if not detected and corrected quickly, may lead to cascading failures of other services (such as storage services) that rely on the core services. The health of the monitoring clusters may itself become an issue for highly critical service-providing clusters. The low-overhead techniques of using timing information associated with the probes issued by the monitoring cluster, to check the health state of the monitoring cluster itself, may be beneficial in environments where the service-providing cluster nodes may tend to be heavily used.

Illustrative Computer System

Figure 11:
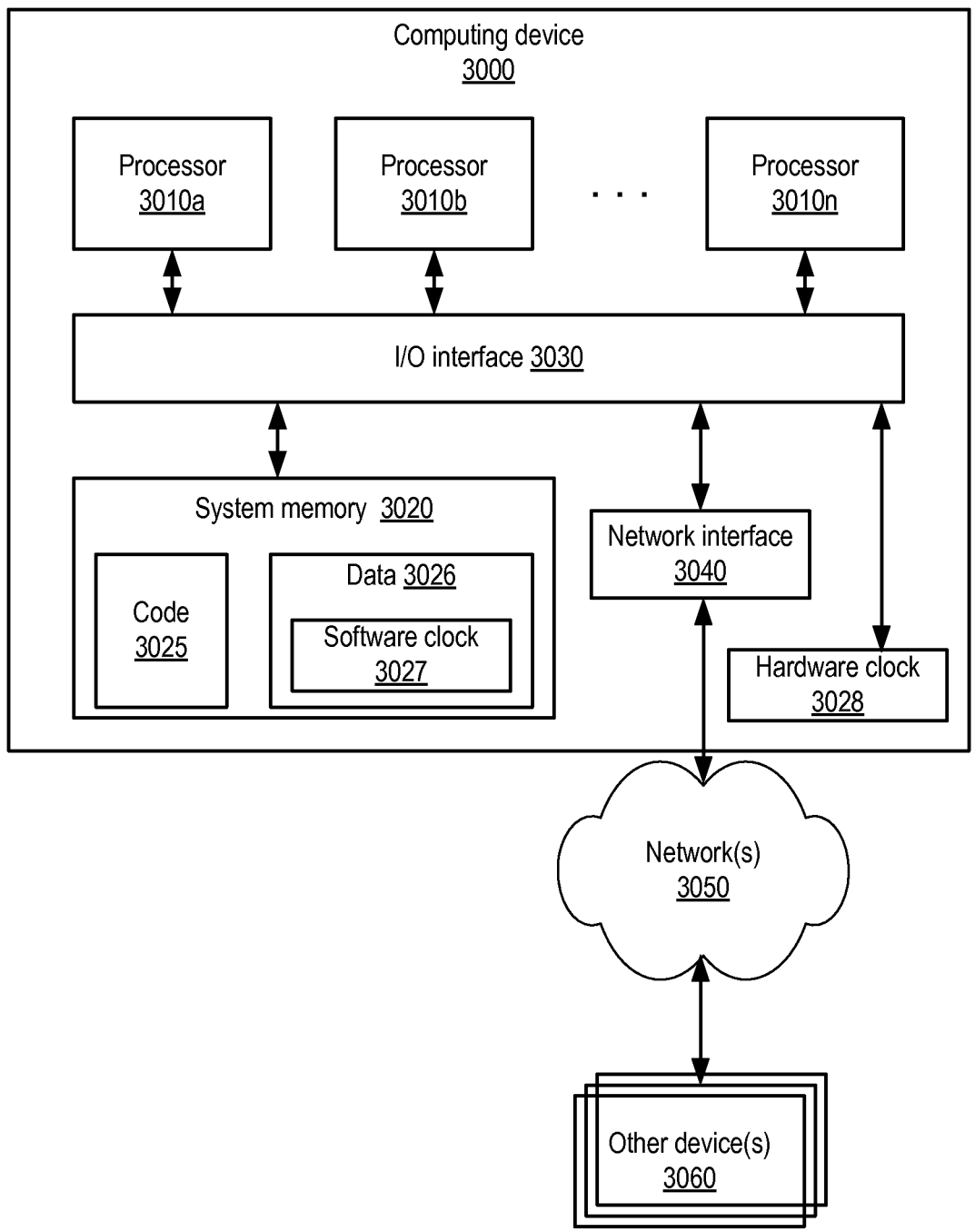
FIG. 11 is a block diagram illustrating an example computing device that may be used in some embodiments.

In at least some embodiments, a server that implements a portion or all of one or more of the technologies described herein, including the techniques to implement the functionality of the service-providing nodes, the monitoring nodes, the health aggregators, and the monitoring manager, may include a general-purpose computer system that includes or is configured to access one or more computer-accessible media. FIG. 11 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026. In at least some embodiments one or more software clocks 3027 may be maintained, e.g., as a respective logical timestamp associated with one or more logical entities such as the state manager registry described. In some embodiments a software clock 3027 may simply be implemented as a 64-bit number that is incremented when the state of the corresponding entity (such as a shared state registry) changes.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010. Computing device 3000 may include one or more hardware clocks 3028 in some embodiments, output from which may be used to determine a time-of-day for the computing device as a whole, to generate timestamps or software clock values, and so on.

Network interface 3040 may be configured to allow data to be exchanged between computing device 3000 and other devices 3060 attached to a network or networks 3050, such as other computer systems or devices as illustrated in FIGS. 1 through 10, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices comprising respective hardware processor and memory and configured to implement:
a service-providing cluster comprising a first plurality of nodes implementing at least a portion of a distributed network-accessible service; and
a monitoring cluster comprising a plurality of monitoring nodes;
wherein each monitoring node of the plurality of monitoring nodes of the monitoring cluster comprises a respective monitoring agent configured to:
iteratively issue one or more probes to at least one service-providing node of the service-providing cluster in accordance with a first cluster health monitoring policy, wherein the first cluster health monitoring policy indicates a number of probe attempts per node of the at least one service-providing node, and wherein the one or more probes are iteratively issued based at least in part on:
whether a number of issued one or more probes is less than the number of probe attempts; and
whether a response from the at least one service-providing node is received in response to the issued one or more probes;
generate a service-providing node health check record indicative of a healthy state of the at least one service-providing node based at least in part on receiving a result of the one or more probes occurring during a specified time interval; and
generate a service-providing cluster health check record indicative of a healthy state of the service-providing cluster based at least in part on determining whether a plurality of service-providing node health check records satisfies a threshold number of active service-providing nodes during the specified time interval, wherein at least one of the plurality of service-providing node health check records is generated by at least one other monitoring node of the plurality of monitoring nodes; and
wherein each node of the first plurality of nodes in the service-providing cluster comprises a respective service component of the distributed network-accessible service, and at least one node of the service-providing cluster comprises a meta-monitoring agent configured to generate a monitoring cluster health check record indicative of a healthy state of the monitoring cluster based at least in part on a second cluster health monitoring policy that differs from the first cluster health monitoring policy, wherein the second cluster health monitoring policy indicates a threshold number of active monitoring cluster nodes providing updates during a second specified time interval.

2. The system as recited in claim 1, wherein the distributed network-accessible service comprises an implementation of a consensus-based protocol to determine whether a transaction comprising a requested write operation to a shared data repository is to be committed, wherein at least one probe of the one or more probes issued by a particular monitoring agent of a particular monitoring node of the monitoring cluster comprises a transaction request including at least one write operation, and wherein, in accordance with the first cluster health monitoring policy, the particular monitoring agent is configured to:
generate a service-providing cluster health check record indicating that the service-providing cluster is in a healthy state based at least in part on receiving a commit indication corresponding to the transaction request.

3. The system as recited in claim 1, wherein, in accordance with the second cluster health monitoring policy, the meta-monitoring agent at the at least one node of the service-providing cluster is configured to:
generate a monitoring cluster health check record indicating that the monitoring cluster is in a healthy state based at least in part on determining that a probe was received at the service-providing cluster from the respective monitoring agent of at least one of the monitoring nodes of the monitoring cluster within a different time interval indicated in the second cluster health monitoring policy.

4. The system as recited in claim 1, further comprising one or more computing devices configured to implement a health aggregator configured to:
collect the plurality of service-providing node health check records of the service-providing cluster from the one or more nodes of the monitoring cluster, over the specified time interval that is specified in the first cluster health monitoring policy; and
initiate one or more corrective actions in response to a determination that the service-providing cluster is not in a healthy state, wherein the determination is based at least in part on an analysis of the plurality of service-providing node health check records.

5. The system as recited in claim 1, wherein, in accordance with the first cluster health monitoring policy, a particular monitoring agent at a particular node of the monitoring cluster is further configured to:
in response to determining that a result of a first probe issued to a first selected node of the service-providing cluster does not indicate that the service-providing cluster is in a healthy state,
identify one or more additional nodes of the service-providing cluster to be probed before a service-providing cluster health check record indicating that the service providing cluster is in an unhealthy state is generated, wherein a number of the one or more additional nodes of the service-providing cluster to be probed is indicated by the first cluster health monitoring policy; and
generate a service-providing cluster health check record indicating that the service-providing cluster is not in a healthy state based at least in part on results of one or more probes issued to each node of the one or more additional nodes.

6. The system as recited in claim 1, wherein the meta-monitoring agent is further configured to send the monitoring cluster health check record to a health aggregator.

7. A method, comprising:
from a plurality of monitoring nodes of a monitoring cluster implemented on one or more computing devices, iteratively issuing one or more probes to a plurality of service-providing nodes of a service-providing cluster in accordance with a first cluster health monitoring policy, wherein the service-providing cluster comprises a plurality of nodes configured to implement at least a portion of a distributed network-accessible service;

determining that a particular service-providing node is in a healthy state based at least in part on a result of a probe issued from a particular monitoring node of the monitoring cluster occurring during a specified time interval;

determining that the service-providing cluster is in a healthy state based at least in part on determining whether a plurality of healthy service-providing service nodes of the plurality of service-providing nodes satisfies a threshold number of active service providing nodes during the specified time interval, wherein the plurality of healthy service-providing service nodes is determined by at least two of the plurality of monitoring nodes;

determining that a particular monitoring node is in a healthy state based at least in part on a result of one or more computations performed at a particular service-providing node of the service-providing cluster in accordance with a second cluster health monitoring policy that differs from the first cluster health monitoring policy; and determining that the monitoring cluster based at least in part on determining whether a plurality of healthy monitoring nodes of the plurality of monitoring nodes of the monitoring cluster satisfies a threshold number of active monitoring nodes.

8. The method as recited in claim 7, wherein the distributed network-accessible service comprises an implementation of a protocol to determine whether a transaction comprising a write operation to a shared data repository is to be committed, wherein at least one probe of the issued one or more probes issued by a particular monitoring agent of a particular monitoring node of the monitoring cluster comprises a transaction request including at least one write operation, wherein said determining the health state of the service-providing cluster comprises:

determining that the service-providing cluster is in a healthy state based at least in part on receiving a commit indication corresponding to the transaction request.

9. The method as recited in claim 7, wherein said determining the health state of the monitoring cluster comprises:

determining that the monitoring cluster is in a healthy state based at least in part on determining that a probe was received at the service-providing cluster from at least one of the monitoring nodes of the monitoring cluster within a different time interval indicated in the second cluster health monitoring policy.

10. The method as recited in claim 7, wherein said determining the health state of the service-providing cluster comprises collecting a plurality of health check records of the service-providing cluster from a first node and a second node of the monitoring cluster, over the specified time interval that is specified in the first cluster health monitoring policy, further comprising:

initiating one or more corrective actions in response to a determination that the service-providing cluster is not in a healthy state, wherein the determination is based at least in part on an analysis of health check records collected from the first and second nodes.

11. The method as recited in claim 7, further comprising:

in response to determining that a result of a first probe issued to a first selected node of the service-providing cluster does not indicate that the service-providing cluster is in a healthy state,
identifying one or more additional nodes of the service-providing cluster to be probed; and
determining that the service-providing cluster is not in a healthy state based at least in part on results of one or more probes issued to the one or more additional nodes.

12. The method as recited in claim 7, wherein a first node of the monitoring cluster is implemented within a first availability zone of a provider network, and wherein a second node of the monitoring cluster is implemented within a second availability zone of the provider network.

13. The method as recited in claim 7, further comprising:
implementing a programmatic interface to allow a requester to submit a cluster health status query; and
wherein at least one probe of the one or more probes issued by the particular monitoring node of the monitoring cluster is formatted in accordance with the programmatic interface.

14. The method as recited in claim 7, wherein the one or more computations performed at the particular service-providing node of the service-providing cluster include an analysis of a probe issued by the particular service-providing node of the service-providing cluster to a selected node of the monitoring cluster.

15. The method as recited in claim 7, wherein a first node of the service-providing cluster comprises a process executing at a particular computing device, and wherein a first node of the monitoring cluster comprises another process executing at the particular computing device.

16. The method as recited in claim 7, further comprising:
determining a first metric of networking overhead, and a second metric of computing overhead, associated with the implementation of the first health monitoring policy; and
modifying a tunable setting governing a time interval between probes based at least in part on one of: the first metric, or the second metric.

17. The method as recited in claim 7, wherein at least one node of the service-providing cluster is owned by a first business organization, and wherein at least one node of the monitoring cluster is owned by a different business organization.

18. A non-transitory computer-accessible storage medium storing program instructions that, when executed on one or more processors, cause the one or more processors to:

iteratively issue one or more probes from each node of one or more monitoring nodes of a monitoring cluster to at least one node of a monitored cluster, wherein the one or more nodes of the monitoring cluster are implemented on one or more computing devices;

determine that a monitored node of the monitored cluster is in a healthy state based at least in part on a result of a probe issued from a particular monitoring node of the monitoring cluster;

determine that the monitored cluster is in a healthy state based at least in part on one or more healthy monitored nodes of one or more monitored nodes of the monitored cluster satisfying an active monitored node threshold; and determine, at a particular node of the monitored cluster, that the monitoring cluster is in a healthy state based at least in part on whether at least one registry update performed by respective probes from the one or more nodes of the monitoring cluster occurred within a specified time interval.

19. The storage medium as recited in claim 18, wherein the monitored cluster is configured to implement a distributed network-accessible service, wherein the service comprises an implementation of a protocol to determine whether a transaction including a write operation to a shared data repository is to be committed, wherein at least one probe of the one or more probes issued by a particular monitoring agent of the particular monitoring node of the monitoring cluster comprises a transaction request including at least one write operation, wherein to determine the health state of the monitored cluster, the instructions when executed on the one or more processors:
  determine that the monitored cluster is in a healthy state based at least in part on receiving a commit indication corresponding to the transaction request.

20. The storage medium as recited in claim 18, wherein to determine the health state of the monitoring cluster, the instructions when executed on the one or more processors:
  determine that the monitoring cluster is in a healthy state based at least in part on determining that a probe was received at the monitored cluster from at least one of the nodes of the monitoring cluster within the specified time interval.

21. The storage medium as recited in claim 18, wherein the instructions when executed on the one or more processors:
  to determine that the monitored cluster is in a healthy state, collect a plurality of health check records of the monitored cluster from a first node and a second node of the monitoring cluster, over the specified time interval that is specified in a cluster health monitoring policy, and
  initiate one or more corrective actions in response to a determination that the monitored cluster is not in a healthy state, wherein the determination is based at least in part on an analysis of health check records collected from the first and second nodes.

22. The storage medium as recited in claim 18, wherein the instructions when executed on the one or more processors:
  in response to determining that a result of a first probe issued to a first selected node of the monitored cluster does not indicate that the monitored cluster is in a healthy state,
    identify one or more additional nodes of the monitored cluster to be probed; and
    determine that the monitored cluster is not in a healthy state based at least in part on results of one or more probes issued to the one or more additional nodes.

23. The storage medium as recited in claim 18, wherein a first node of the monitoring cluster is implemented within a first data center of a provider network, and wherein a second node of the monitoring cluster is implemented within a second data center of the provider network.

24. The storage medium as recited in claim 18, wherein the instructions when executed on the one or more processors:
  implement a programmatic interface to allow a requester to submit a health status query; and
  wherein at least one probe of the one or more probes issued by the particular monitoring node of the monitoring cluster is formatted in accordance with the programmatic interface.

25. The storage medium as recited in claim 18, wherein the one or more computations performed at the particular node of the monitored cluster include an analysis of a probe issued by the particular node of the monitored cluster to a selected node of the monitoring cluster.

26. The storage medium as recited in claim 18, wherein:
  determining the health state of the monitored cluster is further based on applying, at the monitoring cluster, a first cluster health monitoring policy, wherein the specified time interval is specified in the first cluster health monitoring policy; and
  determining the health state of the monitoring cluster is further based on applying, at the monitored cluster, a second cluster health monitoring policy that differs from the first cluster health monitoring policy.

* * * * *